United States Patent
Kamiya et al.

(10) Patent No.: US 8,435,114 B2
(45) Date of Patent: May 7, 2013

(54) GAME PROGRAM, GAME APPARATUS, AND GAME METHOD

(75) Inventors: Keisuke Kamiya, Osaka (JP); Akira Toyama, Osaka (JP); Rieko Akane, Osaka (JP); Makoto Nishino, Kyoto (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 543 days.

(21) Appl. No.: 12/272,247

(22) Filed: Nov. 17, 2008

(65) Prior Publication Data

US 2009/0075731 A1 Mar. 19, 2009

Related U.S. Application Data

(63) Continuation of application No. PCT/JP2007/059739, filed on May 11, 2007.

(30) Foreign Application Priority Data

Jun. 15, 2006 (JP) .................................. 2006-165622

(51) Int. Cl.
*G06F 17/00* (2006.01)
(52) U.S. Cl.
USPC .......................................................... 463/29
(58) Field of Classification Search .................. 463/9, 29
See application file for complete search history.

(56) References Cited

U.S. PATENT DOCUMENTS

| | | | | |
|---|---|---|---|---|
| 6,561,811 | B2 * | 5/2003 | Rapoza et al. | 434/236 |
| 6,606,104 | B1 * | 8/2003 | Kondo et al. | 715/764 |
| 6,758,746 | B1 * | 7/2004 | Hunter et al. | 463/9 |
| 7,950,991 | B2 * | 5/2011 | Shiozawa | 463/9 |
| 2002/0016195 | A1 | 2/2002 | Namba et al. | |
| 2003/0134679 | A1 * | 7/2003 | Siegel et al. | 463/43 |

FOREIGN PATENT DOCUMENTS

| | | |
|---|---|---|
| JP | H11-342263 A | 12/1999 |
| JP | 2001-321565 A | 11/2001 |
| JP | 2002-045572 A | 2/2002 |
| JP | 2002-320775 A | 11/2002 |
| JP | 2005-095601 A | 4/2005 |
| TW | 222890 B | 11/2004 |

OTHER PUBLICATIONS

KOEI Corporation, "Romance of the Three Kingdoms" game manual, (c) 1989 by KOEI Corporation.*

(Continued)

*Primary Examiner* — Arthur O. Hall
*Assistant Examiner* — Nicholas Ditoro
(74) *Attorney, Agent, or Firm* — Global IP Counselors, LLP

(57) ABSTRACT

The fun of a game is increased, and the player can be induced to play the game repeatedly. Belonging group determining means determines that the prefecture to which a player character belongs is Osaka Prefecture, belonging group variable determining means determines that the enthusiasm rank parameter of Osaka Prefecture is "normal"=0 points, belonging group event result determining means determines the result of a predetermined event with respect to the player character, and belonging group variable varying means varies the enthusiasm rank parameter of Osaka Prefecture according to the result of the predetermined event with respect to the player character.

8 Claims, 19 Drawing Sheets

| ENTHUSIASM RANK PARAMETER | BELONGING GROUP EVENT PROBABILITY OF OCCURRENCE | RELATED BELONGING GROUP EVENT PROBABILITY OF OCCURRENCE |
|---|---|---|
| NORMAL | 50% | 10% |
| FEVER | 70% | 20% |
| HIGH FEVER | 100% | 30% |

OTHER PUBLICATIONS

Hall, Bob; Character Attributes in Role-Playing Games, Copyright © 1997; As downloaded from the archive.org wayback machine from url: http://replay.web.archive.org/20010708035553/http://hiddenway.tripod.com/articles/attrib.html with an archive.org verified date of Jul. 8, 2001.*

The computer game "Top Spin 2" released Aug. 3, 2006 by Indie Built Inc., as evidenced by the game FAQ document written by Gromzz, with a Gamefaqs.com upload date of Apr. 11, 2006, downloaded by the USPTO on Sep. 27, 2012 from http://www.gamefaqs.com/xbox360/928289-top-spin-2/faqs/42208.*

Sekai Saisoku Scoop Special Part 2 Jikkuo Powerful Puro Yakyu 13, Shukan Fami Tsu, May 26, 2006, vol. 21, No. 1, Whole No. 910, pp. 187-189.

* cited by examiner

| ENTHUSIASM RANK PARAMETER | BELONGING GROUP EVENT PROBABILITY OF OCCURRENCE | RELATED BELONGING GROUP EVENT PROBABILITY OF OCCURRENCE |
|---|---|---|
| NORMAL | 50% | 10% |
| FEVER | 70% | 20% |
| HIGH FEVER | 100% | 30% |

GAME PROGRAM, GAME APPARATUS, AND GAME METHOD

CROSS REFERENCE TO THE RELATED APPLICATIONS

This application claims priority to Japanese Patent Application No. 2006-165622 and International Patent Application No. PCT/JP2007/059739. The entire disclosure of Japanese Patent Application No. 2006-165622 and International Patent Application No. PCT/JP2007/059739 is hereby incorporated herein by reference

BACKGROUND OF INVENTION

1. Technical Field

The present invention relates to a game program, and particularly to a game program for causing a computer to implement a game for developing a game character moved by a player. The present invention also relates to a game apparatus and a game method implemented by the game program.

2. Background Art

Various games have conventionally been proposed. One of these is a video game, e.g., a baseball game in which player characters displayed on a monitor are caused to move and a contest is carried out. In this type of baseball game, a player can select one baseball team to which player characters belong, and can compete with another computer or player that selects another baseball team (see Non-patent Document 1: Jikkyou Powerful Pro Yakyuu 11, Authorized Guide Complete Edition, Japan, Konami Digital Entertainment, 16 Sep. 2004.)

Among such baseball games, a game is known in which a player selects one player character, for example, and develops the player character by performing a training event or other event for increasing or decreasing various types of ability value parameters relating to the player character.

An objective of such a development game is to increase the various ability value parameters relating to the player character selected by the player and develop a pro baseball player who is a player character having high ability value parameters. In this game, when a pitcher character, for example, is selected, various type of training events are performed for increasing the pace, control, stamina, and other ability value parameters of the pitcher character. Examples of the various types of training events include stamina training, pace training, curve ball training, fielding training, mental training, and the like, and the ability value parameters of the player character increase according to the training event. When the ability value parameters of the player character increase, the manager evaluation, scout evaluation, and other parameters increase, and the player character has an increased probability of becoming a pro baseball player in a draft conference event. In this type of development game, a single player character selected by the player becoming a pro baseball player is a condition for finishing the game. When one player character becomes a pro baseball player, and the game is finished, the player selects another new player character and develops the player character from the beginning.

SUMMARY OF INVENTION

In the aforementioned conventional development game, a single player character selected by the player becoming a pro baseball player is a condition for finishing the game. Therefore, once a single player character becomes a pro baseball player and the game is finished, the player must select another new player character and develop the player character from the beginning. Even though the prior game has been finished, since the player character must be developed from the beginning in the same type of environment as the prior game, the game is less interesting, and this reduced interest may make the player less likely to replay the game.

An object of the present invention is to increase the fun of a game and enable the player to repeatedly play the game.

The game program according to a first aspect is a program for implementing the following functions in a computer that is capable of implementing a game for developing a game character moved by a player.

(1) A belonging group determining function for determining a belonging group to which the game character belongs.

(2) A belonging group variable determining function for determining a belonging group variable of an initial state at the time of a first game and determining the belonging group variable determined in a preceding game at the time of a second or subsequent game with respect to a belonging group variable for indicating a degree of influence to which development of the game character belonging to the belonging group is influenced in association with the belonging group.

(3) A belonging group variable varying function for varying the belonging group variable according to a result of a predetermined event with respect to a game character in the belonging group.

In the game implemented by this program, the belonging group to which the game character belongs is determined in the belonging group determining function. In the belonging group variable determining function, the belonging group variable of an initial state is determined at the time of a first game, and the belonging group variable determined in a previous game is determined at the time of a second or subsequent game with respect to a belonging group variable for indicating a degree of influence to which development of the game character is influenced in association with the belonging group. In the belonging group variable varying function, the belonging group variable is varied according to the result of a predetermined event with respect to a game character in the belonging group.

For example, a case will be considered in which a game is implemented for developing a player character selected by the player in a baseball game in which the player character is moved.

In this case, a belonging group to which the game character belongs is first determined by the belonging group determining function. In the belonging group determining function, the belonging group to which the game character belongs is determined. The game character in this case is a pitcher character, a batter character, or other player character selected by the player. The belonging group to which the game character belongs is a geographic region, an administrative division of Japan, a school, a team, or other group to which the player character belongs that is selected by the player. Specifically, the administrative division of Japan that is the belonging group to which the player character (game character) belongs is determined as Osaka Prefecture, for example.

Then, a belonging group variable of an initial state is determined at the time of a first game, and the belonging group variable determined in a preceding game is determined at the time of a second or subsequent game by the belonging group variable determining function with respect to a belonging group variable for indicating a degree of influence to which development of the game character belonging to the belonging group is influenced in association with the belonging group. In the belonging group variable determining function, a belonging group variable of an initial state is determined at the time of a first game, and the belonging group variable determined in a preceding game is determined at the time of a second or subsequent game with respect to a belonging group variable for indicating a degree of influence to which development of the game character belonging to the belonging group is influenced in association with the belonging group. The belonging group variable herein is a parameter for indicating a degree of influence to which the belonging group influences the game character that belongs to the belonging group, and is an enthusiasm rank parameter, for example, for influencing the player character belonging to the administrative division. The enthusiasm rank parameter has three ranks that include "normal," "fever," and "high fever," for example, and the degree of influence on the player character belonging to the administrative division increases the higher the number of points, wherein "normal"=0 points, "fever"=1 point, and "high fever"=2 points. In a case in which the enthusiasm rank parameter as the belonging group variable is "fever"=1 point, the degree of influence on the player character belonging to the administrative division is higher than in a case in which the enthusiasm rank parameter is "normal"=0 points. In this instance, the enthusiasm rank parameter that is the belonging group variable of Osaka Prefecture, which is the belonging group, is determined to be "normal"=0, for example.

The belonging group variable is varied according to the result of a predetermined event with respect to a game character in the belonging group by the belonging group variable varying function. In the belonging group variable varying function, the belonging group variable is varied according to the result of a predetermined event with respect to a game character in the belonging group. The result of a predetermined event with respect to a game character in the belonging group in this instance is the result of a predetermined event in which the game is finished, for example, in which the player character is named as a pro baseball player in a draft conference event, for example, such as the team to which the player character belongs winning in a Koshien Tournament event, and the player character in the draft conference event being named as a pro baseball player. Specifically, for a result in which the player character is named as a pro baseball player in the draft conference event, for example, the enthusiasm rank parameter that is the belonging group parameter increases by 1 point, and the enthusiasm rank parameter increases from "normal"=0 points to "fever"=1 point. For a result in which the team to which the player character belongs wins in the Koshien Tournament event, and the player character is named as a pro baseball player in the draft conference event, the enthusiasm rank parameter that is the belonging group parameter increases to 2 points, and the enthusiasm rank parameter increases from "normal"=0 points to "high fever"=2 points. In this instance, the enthusiasm rank parameter that is the belonging group variable is varied according to the result of the predetermined event with respect to the player character.

In this game program, the belonging group to which the game character belongs is determined by the belonging group determining function, the belonging group variable is determined by the belonging group variable determining function, and the belonging group variable is varied according to the result of a predetermined event with respect to a game character in the belonging group by the belonging group variable varying function. Specifically, the administrative division to which the player character belongs is determined by the belonging group determining function, the enthusiasm rank parameter of the administrative division is determined by the belonging group variable determining function, and the enthusiasm rank parameter of the administrative division is varied according to the result of a predetermined event with respect to the player character by the belonging group variable varying function. In this arrangement, the administrative division or other belonging group, and the enthusiasm rank parameter or other belonging group variable are newly introduced, and the enthusiasm rank parameter or other belonging group variable increases according to the result of a predetermined event such as naming of the player character as a pro baseball player in the draft conference event. In a case in which naming of the player character as a pro baseball player in the draft conference event is a condition for finishing the game, when one player character becomes a pro baseball player, and the game is finished, if the player selects the same administrative division in the next game as in the previous game, the enthusiasm rank parameter of the selected administrative division is higher. Since the enthusiasm rank parameter is a parameter for indicating the degree of influence that the administrative division has on the player character belonging to the administrative division, the degree of influence exerted by the administrative division on the player character belonging to the administrative division increases when the enthusiasm rank parameter of the selected administrative division increases, and an environment can therefore be obtained in which the player can develop a player character more easily than in the previous game. Consequently, since the player can obtain the benefit of an increased enthusiasm rank parameter, for example, for having finished the previous game, the player character is no longer developed from the beginning in the same type of environment as the previous game regardless of the fact that the previous game was finished, as in the conventional game, and the fun of the game is increased. Furthermore, the player can also increase the enthusiasm rank parameter of each administrative division, and a new, conventionally unavailable game objective can be obtained in which player characters that newly enter the team every following year, for example, are played in an improved environment created by the player, and the player can therefore continue to build better environments for the player characters.

The game program according to a second aspect is a program for causing a computer to furthermore implement the function described below in the game program according to the first aspect.

(4) A belonging group event result determining function for determining a result of a predetermined event with respect to a game character in the belonging group, according to the belonging group variable.

In the belonging group event result determining function in the game implemented by this program, the result of a predetermined event with respect to a game character in the belonging group is determined according to the belonging group variable. The result of a predetermined event with respect to a game character in the belonging group in this case is the result of variation of a characteristic relating to the player character, or a characteristic relating to the team or administrative division due to an event relating to the administrative division that is the belonging group, for example. Since the result of a predetermined event is determined according to the enthusiasm rank parameter that is the belonging group variable; i.e., since the variation ratio of a characteristic relating to the player character, or a characteristic relating to the team or administrative division varies according to the enthusiasm rank parameter, the variation ratio of the characteristic relating to the player character, or the characteristic relating to the team or administrative division varies more significantly the greater the enthusiasm rank parameter is, for example. The team objective of increasing the enthusiasm rank parameter of each administrative division is thereby more clearly defined, and the player can therefore be induced to play the game repeatedly.

The program according to a third aspect is the game program according to the second aspect, wherein the belonging group event result determining function is a function for determining a result of a predetermined event with respect to a game character in the belonging group by varying a variation ratio of a predetermined characteristic relating to the game character, according to the belonging group variable. In this case, since the variation ratio of the characteristic relating to the game character varies according to the enthusiasm rank parameter that is the belonging group variable, for example, the variation ratio of an ability value parameter of the player character or another characteristic relating to the player character can be varied according to the size of the enthusiasm rank parameter in an event relating to the administrative division that is the belonging group, for example. In this arrangement, the variation ratio of a characteristic relating to the player character is varied more significantly the greater the enthusiasm rank parameter is, for example, and the player can thereby be induce to play the game repeatedly.

The program according to a fourth aspect is the game program according to any of the first through third aspects, wherein the belonging group determining function is a function for selecting the belonging group to which the game character belongs from among a plurality of belonging groups. In this arrangement, since the player can select any belonging group from among a plurality of belonging groups, the player can select his favorite administrative division, team, or other belonging group or select an administrative division, team, or other belonging group that has a large enthusiasm rank parameter as the belonging group variable, and obtain an environment in which the player character can easily be developed.

The game program according to a fifth aspect is a program for causing a computer to furthermore implement the functions described below in the game program according to the fourth aspect.

(5) A related belonging group determining function for determining a related belonging group that is related to the belonging group to which the game character belongs from among the plurality of belonging groups.

(6) A related belonging group event result determining function for determining a result of a predetermined event with respect to a game character in the related belonging group, according to the belonging group variable.

In the related belonging group determining function in the game implemented by this program, a related belonging group that is related to the belonging group to which the game character belongs is determined from among a plurality of belonging groups. In the related belonging group event result determining function, the result of a predetermined event with respect to a game character in the related belonging group is determined according to the belonging group variable. The related belonging group that is related to the belonging group to which the game character belongs is a group that satisfies predetermined conditions relating to the belonging group to which the game character belongs, and is an administrative division adjacent to the administrative division to which the game character belongs, for example. Since the result of a predetermined event with respect to a game character in the related belonging group is determined according to the enthusiasm rank parameter that is the belonging group variable of the administrative division to which the game character belongs, for example, the probability of generating a predetermined event in the related belonging group can be varied, or the degree of influence exerted on the player character by a predetermined event in the related belonging group can be varied according to the enthusiasm rank parameter, and the fun of the game can be further increased.

The game program according to a sixth aspect is a program for causing a computer to furthermore implement the functions described below in the game program according to the fourth aspect.

(7) A related belonging group determining function for determining a related belonging group that is related to the belonging group to which the game character belongs from among the plurality of belonging groups.

(8) A related belonging group variable determining function for determining a related belonging group variable for indicating a degree of influence to which development of the game character belonging to the related belonging group is influenced in association with the related belonging group.

(9) A related belonging group event result determining function for determining a result of a predetermined event with respect to a game character in the related belonging group, according to the related belonging group variable.

In the related belonging group determining function in the game implemented by this program, a related belonging group related to the belonging group to which the game character belongs is selected from among a plurality of belonging groups. In the related belonging group variable determining function, a related belonging group variable is determined for indicating a degree of influence to which development of the game character belonging to the related belonging group is influenced in association with the related belonging group. In the related belonging group event result determining function, a result of a predetermined event with respect to a game character in the related belonging group is determined according to the related belonging group variable. In this arrangement, the related belonging group variable is a parameter for indicating the degree of influence exerted by related belonging group on the game character belonging to the related belonging group, and is a different parameter than the belonging group variable of the belonging group to which the player character belongs. In this arrangement, since the result of a predetermined event with respect to a game character in the related belonging group is determined according to the enthusiasm rank parameter of the adjacent prefecture, which is the related belonging group variable of the administrative division adjacent to the administrative division to which the game character belongs, for example, the degree of influence exerted on the player character by the predetermined event in the related belonging group can be varied according to the enthusiasm rank parameter of the adjacent prefecture, and the fun of the game can be further increased.

The game program according to a seventh aspect is the game program according to any of the first through sixth aspects, wherein the belonging group variable determining function is a function for determining a belonging group variable varied by the belonging group variable varying function of the previous game as the belonging group variable of a game. In this arrangement, since the belonging group variable of the previous game is determined by the belonging group variable of the game, the player can obtain an environment in which the player character can easily be developed by selecting an administrative division in which the enthusiasm rank parameter as the belonging group variable was increased in the previous game, and the player can therefore be induced to play the game repeatedly.

The game apparatus according to an eighth aspect is a game apparatus for implementing a game for developing a game character moved by a player. The game apparatus comprises belonging group determining means, belonging group variable determining means, and belonging group variable varying means. In the belonging group determining means, a belonging group is determined to which the game character belongs. In the belonging group variable determining means, a belonging group variable of an initial state is determined at the time of a first game, and the belonging group variable determined in a preceding game is determined at the time of a second or subsequent game with respect to a belonging group variable for indicating a degree of influence to which development of the game character belonging to the belonging group is influenced in association with the belonging group. In the belonging group variable varying means, the belonging group variable is varied according to a result of a predetermined event with respect to a game character in the belonging group.

The game method according to a ninth aspect is a game method for implementing a game for developing a game character moved by a player. The game method comprises a belonging group determining step, a belonging group variable determining step, and a belonging group variable varying step. In the belonging group determining step, a belonging group is determined to which the game character belongs. In the belonging group variable determining step, a belonging group variable of an initial state is determined at the time of a first game, and the belonging group variable determined in a preceding game is determined at the time of a second or subsequent game with respect to a belonging group variable for indicating a degree of influence to which development of the game character belonging to the belonging group is influenced in association with the belonging group. In the belonging group variable varying step, the belonging group variable is varied according to a result of a predetermined event with respect to a game character in the belonging group.

BRIEF DESCRIPTION OF THE DRAWINGS

Referring now to the attached drawings which form a part of this original disclosure.

DETAILED DESCRIPTION OF THE PREFERRED EMBODIMENTS

Configuration and Operation of the Game Apparatus

Figure 1:
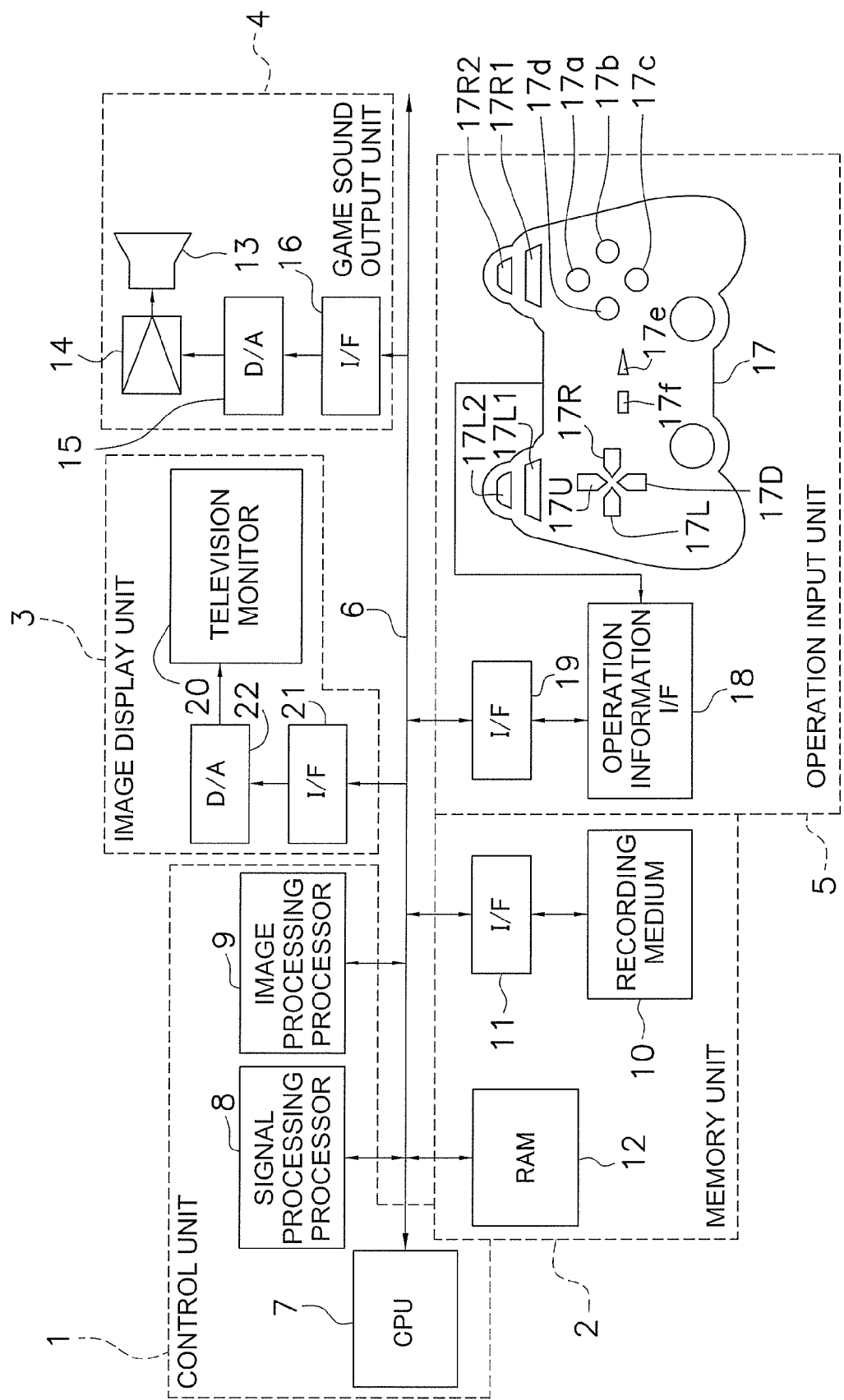
FIG. 1 is a basic structural diagram showing the video game apparatus according to a first embodiment of the present invention.

FIG. 1 shows the basic structure of the game apparatus according to an embodiment of the present invention. A home video game apparatus is described below as an example of the video game apparatus. The home video game apparatus is provided with a home game device main unit and a home television. A recording medium 10 can be mounted in the home game device main unit, and game data are read as needed from the recording medium 10 and the game is executed. In this manner, the executed game content is displayed on the home television.

A game system of a home video game apparatus is composed of a control unit 1, a memory unit 2, an image display unit 3, an audio output unit 4, and an operation input unit 5; and these are connected via a bus 6. The bus 6 includes an address bus, a data bus, a control bus, and the like. In this case, the control unit 1, memory unit 2, audio output unit 4, and operation input unit 5 are housed in the home game device main unit of the home video game apparatus, and the image display unit 3 is housed in the home television.

The control unit 1 is provided primarily for controlling the progress of the game as a whole on the basis of a game program. The control unit 1 is composed, for example, of a CPU (Central Processing Unit) 7, a signal processing processor 8, and an image processing processor 9. The CPU 7, the signal processing processor 8, and the image processing processor 9 are connected to each other via the bus 6. The CPU 7 interprets commands from the game program and performs various types of data processing or control. For example, the CPU 7 issues a command to the signal processing processor 8 to feed image data to the image processing processor. The signal processing processor 8 primarily performs calculations in three-dimensional space, positional conversion calculations from three-dimensional space to pseudo-three-dimensional space, light source calculation processing, and processing for generating and processing images and audio data. The image processing processor 9 primarily performs processing for writing image data to be drawn into RAM 12 on the basis of the calculation results and processing results of the signal processing processor 8.

The memory unit 2 is provided primarily for storing program data or various types of data and the like used by the program data. The memory unit 2 is composed, for example, of a recording medium 10, an interface circuit 11, and RAM (Random Access Memory) 12. The interface circuit 11 is connected to the recording medium 10. The interface circuit 11 and the RAM 12 are connected via the bus 6. The recording medium 10 is provided for storing program data of the operation system or for storing game data and the like composed of image data, audio data, and various types of program data. The recording medium 10 is a ROM (Read Only Memory) cassette, an optical disk, a flexible disk, or the like, for example, and stores operating system program data, game data, or the like. Card-type memory is also included in the recording medium 10, and the card-type memory is used primarily for storing various types of game parameters at the time of interruption when a game is interrupted. The RAM 12 temporarily stores various types of data that are read from the recording medium 10, and is used for such purposes as temporarily storing processing results from the control unit 1. Various types of data, and address data for indicating the storage position of the various types of data are stored in the RAM 12, and an arbitrary address can be specified for reading and writing.

The image display unit 3 is provided primarily for outputting an image of image data that are written in the RAM 12 by the image processing processor 9, image data that are read from the recording medium 10, and the like. The image display unit 3 is composed of a television monitor 20, an interface circuit 21, and a D/A converter (Digital-to-Analog converter) 22, for example. The D/A converter 22 is connected to the television monitor or 20, and the interface circuit 21 is connected to the D/A converter 22. The bus 6 is connected to the interface circuit 21. In this arrangement, the image data are fed to the D/A converter 22 via the interface circuit 21 and converted to analog image signals. The analog image signals are outputted as an image to the television monitor 20.

In this case, the image data include polygon data, texture data, and the like, for example. Polygon data are coordinate data of the vertexes that constitute a polygon. Texture data are data for setting textures on the polygons, and are composed of texture instruction data and texture color data. The texture instruction data are data for correlating a polygon and a texture, and the texture color data are data for specifying the color of a texture. In this arrangement, polygon address data and texture address data that indicate the storage positions of the data are correlated with each other in the polygon data and the texture data, respectively. In such image data, polygon data (three-dimensional polygon data) in three-dimensional space indicated by the polygon address data are subjected by the signal processing processor 8 to coordinate conversion and perspective projection conversion on the basis of movement amount data and rotation amount data of an image as such (perspective), and converted to polygon data (two-dimensional polygon data) in two-dimensional space. The external shape of a polygon is formed by a plurality of items of two-dimensional polygon data, and the texture data indicated by the texture address data are written in the internal region of the polygon. Objects in which textures are affixed to polygons, i.e., various types of characters, can thus be displayed.

The audio output unit 4 is provided primarily for outputting sound from audio data that are read from the recording medium 10. The audio output unit 4 is composed of a speaker 13, an amplification circuit 14, a D/A converter 15, and an interface circuit 16, for example. The amplification circuit 14 is connected to the speaker 13, the D/A converter 15 is connected to the amplification circuit 14, and the interface circuit 16 is connected to the D/A converter 15. The bus 6 is connected to the interface circuit 16. In this arrangement, the audio data are fed to the D/A converter 15 via the interface circuit 16 and converted to analog audio signals. The analog audio signals are amplified by the amplification circuit 14 and outputted as sound from the speaker 13. The audio data include ADPCM (Adaptive Differential Pulse Code Modulation) data, PCM (Pulse Code Modulation) data, or the like, for example. In the case of ADPCM data, sound can be outputted from the speaker 13 by the same processing method described above. In the case of PCM data, sound can be outputted from the speaker 13 by the same processing method described above by first converting the PCM data to ADPCM data in the RAM 12.

The operation input unit 5 is primarily composed of a controller 17, an operation information interface circuit 18, and an interface circuit 19. The operation information interface circuit 18 is connected to the controller 17, and the interface circuit 19 is connected to the operation information interface circuit 18. The bus 6 is connected to the interface circuit 19.

The controller 17 is an operation device that is used by the player to input various operating commands, and operating signals that correspond to the operations of the player are transmitted to the CPU 7. The controller 17 is provided with a first button 17*a*, a second button 17*b*, a third button 17*c*, a fourth button 17*d*, an up key 17U, a down key 17D, a left key 17L, a right key 17R, an L1 button 17L1, an L2 button 17L2, an R1 button 17R1, an R2 button 17R2, a start button 17*e*, a select button 17*f*, a left stick 17SL, and a right stick 17SR.

The up key 17U, the down key 17D, the left key 17L, and the right key 17R are used, for example, to present commands to the CPU 7 to move a character or cursor up, down, left, or right on the screen of the television monitor 20.

The start button 17*e* is used to instruct the CPU 7 to load the game program from the recording medium 10.

The select button 17*f* is used to specify various selections to the CPU 7 for the game program that is loaded from the recording medium 10.

The left stick 17SL and the right stick 17SR are stick-type controllers having substantially the same structure as a so-called joystick. The stick-type controllers have an upright stick. The stick is configured so as to be capable of tilting from the upright position through 360° of directions that include forward, backward, left, and right with respect to a center support point. The left stick 17SL and the right stick 17SR transmit the values of an x coordinate and a y coordinate as an operation signal using the upright position as the origin according to the tilt direction and tilt angle of the sticks to the CPU 7 via the operation information interface circuit 18 and the interface circuit 19.

Various types of functions are assigned to the first button 17*a*, the second button 17*b*, the third button 17*c*, the fourth button 17d, the L1 button 17L1, the L2 button 17L2, the R1 button 17R1, and the R2 button 17R2 according to the game program that is loaded from the recording medium 10.

The buttons and keys of the controller 17 other than the left stick 17SL and the right stick 17SR are on/off switches that are switched on by being pushed from the center position by outside pressure and switched off by returning to the center position when pressure is withdrawn.

The overall operation of the home video game apparatus configured as described above will next be described. When the power supply switch (not shown) is turned on to supply electrical power to the game system 1, the CPU 7 reads image data, audio data, and program data from the recording medium 10 on the basis of the operating system stored in the recording medium 10. Some or all of the image data, audio data, and program data thus read is stored in the RAM 12. The CPU 7 then issues a command for the image data or audio data stored in the RAM 12 on the basis of the program data that are stored in the RAM 12.

In the case of image data, the signal processing processor 8 first performs position calculations, light source calculations, and the like of a character in three-dimensional space on the basis of the command from the CPU 7. The image processing processor 9 then performs write processing and the like of image data to be drawn into the RAM 12 on the basis of the calculation results of the signal processing processor 8. The image data written in the RAM 12 are then fed to the D/A converter 22 via the interface circuit 21. The image data are converted to analog video signals by the D/A converter 22. The image data are fed to the television monitor 20 and displayed as an image.

In the case of audio data, the signal processing processor 8 first performs processing for generating and processing audio data on the basis of a command from the CPU 7. In this case the audio data are processed to convert pitches, add noise, set envelopes, set levels, add reverb, and perform other processing, for example. The audio data are then outputted from the signal processing processor 8 and fed to the D/A converter 15 via the interface circuit 16. The audio data are converted to analog audio signals. The audio data are then outputted from the speaker 13 via the amplification circuit 14 as sound.

Overview of Various Routines in the Game Apparatus

Figure 2:
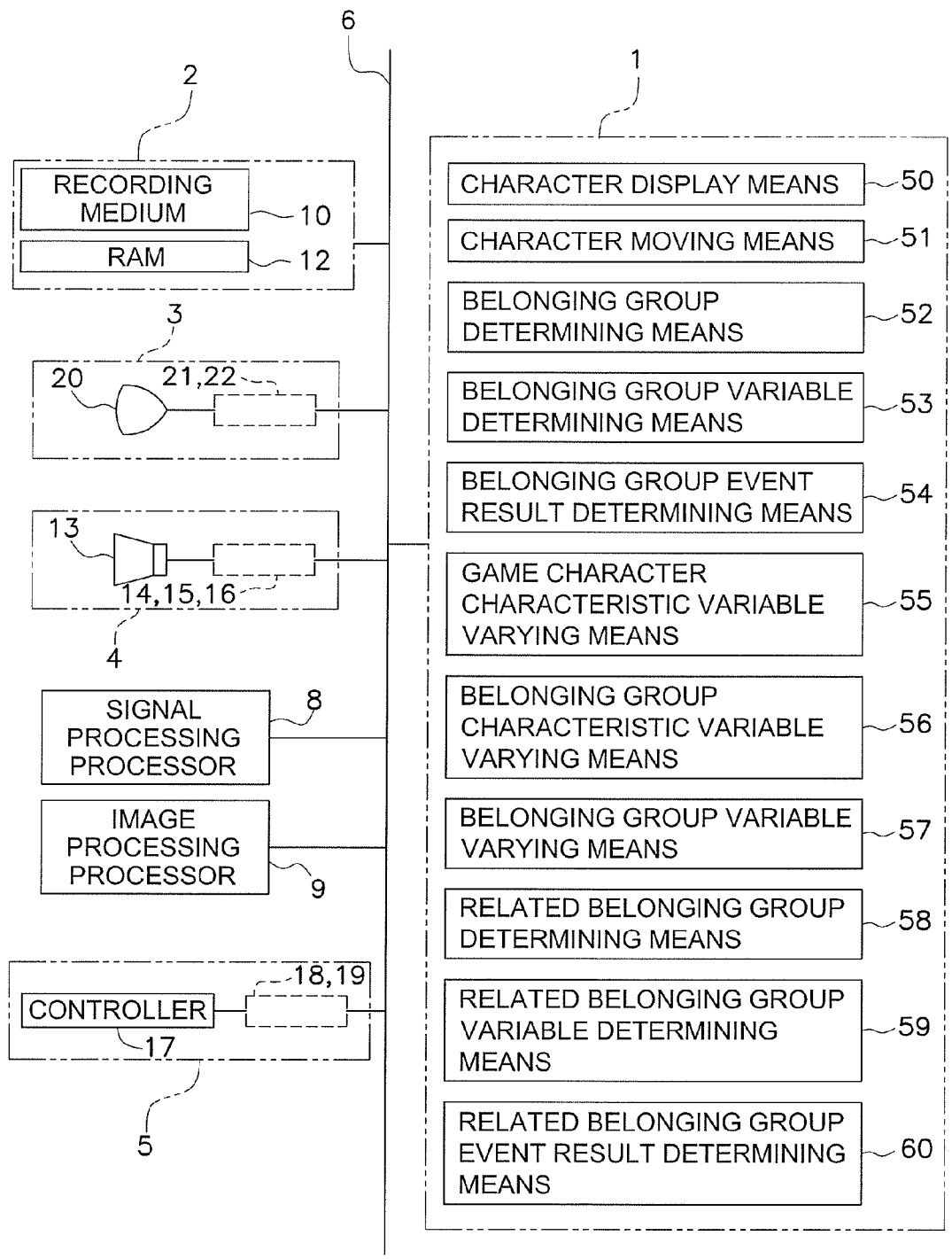
FIG. 2 is a function block diagram showing the video game apparatus.

The game implemented in the present game device is a baseball game (game contest), for example. This baseball game is a game in which a player selects a single player character 41 (see FIGS. 5 through 12) and develops the player character 41 by performing training events or other events for increasing or decreasing various ability value parameters that relate to the player character 41. The present game device is capable of implementing a game for moving the player character 41 displayed on the television monitor 20 through the operation of the controller 17. The region selection screen 31 shown in FIG. 3, the administrative division selection screen 32 shown in FIG. 4, the event initiation display screens 42 or event result display screens 43 shown when various events occur as shown in FIGS. 5 through 12, and other screens are displayed on the television monitor 20. FIG. 2 is a functional block diagram showing the functions that fulfill main roles in the present invention. The control unit 1 primarily comprises character display means 50, character moving means 51, belonging group determining means 52, belonging group variable determining means 53, belonging group event result determining means 54, game character characteristic variable varying means 55, belonging group characteristic variable varying means 56, belonging group variable varying means 57, related belonging group determining means 58, related belonging group variable determining means 59, and related belonging group event result determining means 60.

The character display means 50 is provided with a function for displaying the player character 41 on the television monitor 20. The player character 41 shown in FIGS. 5 through 12 is displayed on the television monitor 20 by the character display means 50.

In this means, player character image data corresponding to the player character 41 are fed to the RAM 12 from the memory unit 2, e.g., the recording medium 10, and stored in the RAM 12 when the game program is loaded. At this time, the player character image data are recognized by the control unit 1, e.g., the CPU 7. Player character coordinate data for displaying the player character image data on the television monitor 20 are also fed to the RAM 12 from the memory unit 2, e.g., the recording medium 10, and stored in the RAM 12. At this time, the player character image data are recognized by the control unit 1, e.g., the CPU 7. The player character image data stored in the RAM 12 are then fed to the television monitor 20 via the image processing processor 9 on the basis of an instruction from the CPU 7. The player character image data are displayed in a predetermined position of the television monitor 20 on the basis of the player character coordinate data. Instructions for displaying the player character image data in predetermined positions of the television monitor 20 are issued by the CPU 7.

The character moving means 51 is provided with a function for moving the player character 41. The player character 41 is moved by the character moving means 51.

In this means, when a signal for moving the player character 41 is recognized by the control unit 1, e.g., the CPU 7, the player character image data corresponding to the player character 41 are processed by the control unit 1, e.g., the signal processing processor 8 and the image processing processor 9, on the basis of an instruction from the CPU 7. The processed image data are then fed from the RAM 12 to the television monitor 20, and the movement of the player character 41 is displayed on the television monitor 20 as a moving image.

The belonging group determining means 52 has a function for determining the belonging group to which the game character belongs. The belonging group to which the game character belongs is determined by the belonging group determining means 52. The game character is the player character 41 selected by the player. The belonging group to which the game character belongs is a region, administrative division, school, team, or other group to which the player character 41 selected by the player belongs. Specifically, when the belonging group to which the game character belongs is an administrative division, the administrative division that is the belonging group to which the player character 41 belongs is determined as Osaka Prefecture (see FIG. 4). Various types of data that include information indicating that the administrative division of Osaka Prefecture is the belonging group to which the player character 41 belongs as determined by the belonging group determining means 52 are stored in the RAM 12.

The belonging group variable determining means 53 has a function for determining the belonging group variable of an initial state at the time of a first game, and determining the belonging group variable determined by the previous game at the time of a second or subsequent game with respect to a belonging group variable for indicating the degree of influence to which the development of the game character belonging to the belonging group is influenced in association with the belonging group. In the belonging group variable determining function 53, the belonging group variable of an initial state is determined at the time of a first game, and the belonging group variable determined in a previous game is determined at the time of a second or subsequent game with respect to a belonging group variable for indicating a degree of influence to which development of the game character is influenced in association with the belonging group. The belonging group variable herein is a parameter for indicating a degree of influence to which the belonging group influences the game character that belongs to the belonging group, and is an enthusiasm rank parameter, for example, for influencing the player character belonging to the administrative division. The enthusiasm rank parameter has three ranks that include "normal," "fever," and "high fever," for example, and the degree of influence on the player character belonging to the administrative division increases the higher the number of points, wherein "normal"=0 points, "fever"=1 point, and "high fever"=2 points. In a case in which the enthusiasm rank parameter as the belonging group variable is "fever"=1 point, the degree of influence on the player character belonging to the administrative division is higher than in a case in which the enthusiasm rank parameter is "normal"=0 points. In this instance, the enthusiasm rank parameter that is the belonging group variable of Osaka Prefecture, which is the belonging group, is determined to be "normal"=0 points, for example, which indicates the initial state (see FIGS. 3 and 4). Various types of data that include the enthusiasm rank parameter that is the belonging group variable of Osaka Prefecture determined by the belonging group variable determining means 53 are stored in the RAM 12.

The belonging group event result determining means 54 has a function for determining the result of a predetermined event with respect to a game character in the belonging group according to the belonging group variable. The result of a predetermined event with respect to a game character in the belonging group is determined by the belonging group event result determining means 54 according to the belonging group variable. The belonging group event result determining means 54 is furthermore provided with a game character characteristic variable varying means 55 for determining the result of a predetermined event with respect to a game character in the belonging group by varying the variation ratio of a predetermined characteristic relating to the game character according to the belonging group variable. The belonging group event result determining means 54 is furthermore provided with a belonging group characteristic variable varying means 56 for determining the result of a predetermined event with respect to a game character in the belonging group by varying the variation ratio of a predetermined characteristic relating to the belonging group according to the belonging group variable.

The game character characteristic variable varying means 55 has a function for varying the variation ratio of a predetermined characteristic relating to the game character according to the belonging group variable. The variation ratio of a predetermined characteristic relating to the game character is varied according to the belonging group variable by the game character characteristic variable varying means 55. The result of a predetermined event with respect to a game character in the belonging group is the result of variation of a characteristic relating to the player character 41 through an event that relates to the administrative division that is the belonging group. Specifically, when the administrative division that is the belonging group is Osaka Prefecture, the event shown in FIG. 5 of eating octopus dumplings in the city of Osaka occurs, and the increase ratio of the ability value parameter of physical strength as the characteristic relating to the player character 41 varies according to the enthusiasm rank parameter with respect to the event of eating octopus dumplings in the city of Osaka. In this arrangement, the variation ratio of the characteristic relating to the player character 41 varies more significantly the larger the enthusiasm rank parameter is. Specifically, the event result of the Osaka event shown in FIG. 6 occurring when the enthusiasm rank parameter is "normal"=0 points is that the physical strength ability value parameter that is the characteristic relating to the player character 41 increases 10 points. This ability value parameter is displayed as shown in FIG. 6 so as correspond to the number "[10]" at the end of the text display "I ate a small order of octopus dumplings in Osaka. I feel rejuvenated. [10]" in the result detail display area 46 described hereinafter. The event result of the Osaka event shown in FIG. 7 occurring when the enthusiasm rank parameter is "fever"=1 point is that the physical strength ability value parameter that is the characteristic relating to the player character 41 increases 20 points. This ability value parameter is displayed as shown in FIG. 7 so as correspond to the number "[20]" at the end of the text display "I ate a regular-sized order of octopus dumplings in Osaka. I feel rejuvenated. [20]" in the result detail display area 46 described hereinafter. The event result of the Osaka event shown in FIG. 8 occurring when the enthusiasm rank parameter is "high fever"=2 points is that the physical strength ability value parameter that is the characteristic relating to the player character 41 increases 50 points. This ability value parameter is displayed as shown in FIG. 8 so as correspond to the number "[50]" at the end of the text display "I ate a giant-sized order of octopus dumplings in Osaka. I feel rejuvenated. [50]" in the result detail display area 46 described hereinafter. Specifically, the point increase of the physical strength ability value parameter that is the characteristic relating to the player character 41 varies to 10 points, 20 points, or 50 points according to whether the enthusiasm rank parameter is "normal"=0 points, "fever"=1 point, or "high fever"=2 points, respectively. In this arrangement, the results of the predetermined event with respect to a game character in the belonging group determined by the game character characteristic variable varying means 55, i.e., the various types of data that include the increased physical strength ability value parameter that is the characteristic relating to the player character 41, are stored in the RAM 12.

The belonging group characteristic variable varying means 56 has a function for varying the variation ratio of a predetermined characteristic relating to the belonging group according to the belonging group variable. The variation ratio of a predetermined characteristic relating to the belonging group is varied by the belonging group characteristic variable varying means 56 according to the belonging group variable. The result of a predetermined event with respect to a game character in the belonging group is the result of variation of a characteristic relating to the team or administrative division due to an event relating to the administrative division that is the belonging group. Specifically, the event shown in FIG. 14 of an increase in the budget of a baseball club due to a predetermined condition occurs, and the increase ratio of a parameter indicating the maintenance condition of the team training equipment, a parameter indicating the size of the budget of the team or administrative division, or another parameter that is the characteristic relating to the belonging group varies according to the enthusiasm rank parameter. In this instance, the variation ratio of the parameter indicating the maintenance condition of the team training equipment, or the parameter indicating the size of the budget of the team or administrative division that is the characteristic relating to the belonging group varies more significantly the larger the enthusiasm rank parameter is. Specifically, in a case in which the enthusiasm rank parameter is "high fever"=2 points, the variation ratio of the parameter indicating the maintenance condition of the team training equipment, or the parameter indicating the size of the budget of the team or administrative division increases in comparison to a case in which the enthusiasm rank parameter is "normal"=0 points. When the parameter indicating the maintenance condition of the team training equipment, or the parameter indicating the size of the budget of the team or administrative division is large, an event occurs in which player characters having high ability value parameters gather from another administrative division by gaining admission to a school outside the player characters' school zone, and the team to which the player character 41 of the player belongs is strengthened, having the effect of making it easier to win in matches and other events, and when the player character 41 trains using maintained training equipment, such effects are obtained as a larger increase ratio of the ability value parameter of the player character 41 due to training. In this arrangement, the increase ratio of the parameter indicating the maintenance condition of the team training equipment, the parameter indicating the size of the budget of the team or administrative division, or another parameter that is the characteristic relating to the belonging group increases according to whether the enthusiasm rank parameter is "normal"=0 points, "fever"=1 point, or "high fever"=2 points. The results of the predetermined event with respect to a game character in the belonging group determined by the belonging group characteristic variable varying means 56, i.e., various types of data that include the parameter indicating the maintenance condition of the team training equipment, or the parameter indicating the size of the budget of the team or administrative division, which is the characteristic relating to the belonging group, are stored in the RAM 12.

The belonging group variable varying means 57 has a function for varying the belonging group variable according to the result of a predetermined event with respect to a game character in the belonging group. The belonging group variable is varied according to the result of a predetermined event with respect to a game character in the belonging group by the belonging group variable varying means 57. In this arrangement, the result of a predetermined event with respect to a game character in the belonging group is a result that is a condition for finishing the game, for example, and is the result of a predetermined game-finishing event in which the player character 41 is named as a pro baseball player in a draft conference event, or an event in which the team to which the player character 41 belongs wins in the Koshien Tournament event, and the player character is named as a pro baseball player in the draft conference event. Specifically, for a result in which the player character 41 is named as a pro baseball player in the draft conference event, the enthusiasm rank parameter that is the belonging group variable increases one point, and the enthusiasm rank parameter increases from "normal"=0 point to "fever"=1 point (see FIGS. 16 and 17). For a result in which the team to which the player character 41 belongs wins in the Koshien Tournament event, and the player character 41 is named as a pro baseball player in the draft conference event, the enthusiasm rank parameter that is the belonging group variable increases two points, and the enthusiasm rank parameter increases from "normal"=0 points to "high fever"=2 points (see FIGS. 18 and 19). In this arrangement, the enthusiasm rank parameter that is the belonging group variable is varied according to the result of the predetermined event with respect to the player character. Various types of data that include the enthusiasm rank parameter that is the belonging group variable determined by the belonging group variable varying means 57 are stored in the RAM 12.

The related belonging group determining means 58 has a function for determining a related belonging group that is related to the belonging group to which the game character belongs from among a plurality of belonging groups (group candidates). A related belonging group that is related to the belonging group to which the game character belongs is determined from among a plurality of belonging groups by the related belonging group determining means 58. The related belonging group that relates to the belonging group to which the game character belongs is a group that satisfies a predetermined condition for being related to the belonging group to which the game character belongs, and is an administrative division adjacent to the administrative division to which the game character belongs. Administrative divisions to which the game character may belong include Hyogo Prefecture, Kyoto Prefecture, Nara Prefecture, and Wakayama Prefecture (see FIG. 4). Various types of data that include information indicating that the adjacent administrative division that is the related belonging group determined by the related belonging group determining means 58 is Hyogo Prefecture, Kyoto Prefecture, Nara Prefecture, or Wakayama Prefecture are stored in the RAM 12.

The related belonging group variable determining means 59 has a function for determining a related belonging group variable for indicating a degree of influence to which training of the game character belonging to the related belonging group is influenced in association with the related belonging group. A related belonging group variable for indicating a degree of influence to which training of the game character belonging to the related belonging group is influenced in association with the related belonging group is determined by the related belonging group variable determining means 59. The belonging group variable herein is a parameter for indicating the degree of influence to which the related belonging group influences the game character belonging to the related belonging group, and is a different parameter than the belonging group variable of the belonging group to which the player character 41 belongs. The enthusiasm rank parameters as the related belonging group variables of Hyogo Prefecture, Kyoto Prefecture, Nara Prefecture, and Wakayama Prefecture are determined to be "normal"=0 points, which indicate the initial state (see FIGS. 3 and 4). In this arrangement, various types of data that include the enthusiasm rank parameters as the related belonging group variables of Hyogo Prefecture, Kyoto Prefecture, Nara Prefecture, and Wakayama Prefecture determined by the related belonging group variable determining means 59 are stored in the RAM 12.

The related belonging group event result determining means 60 has a function for determining the result of a predetermined event with respect to a game character in the related belonging group according to the belonging group variable. The result of a predetermined event with respect to a game character in the related belonging group is determined according to the belonging group variable by the related belonging group event result determining means 60. In this arrangement, the result of a predetermined event with respect to a game character in the related belonging group is determined according to the enthusiasm rank parameter of Osaka Prefecture, which is the belonging group variable of the administrative division to which the game character belongs. Specifically, when the administrative division that is the related belonging group is Wakayama Prefecture, the event shown in FIG. 9 of eating a pickled plum in Wakayama Prefecture occurs, and the increase ratio of the ability value parameter of physical strength as the characteristic relating to the player character 41 varies according to the enthusiasm rank parameter with respect to the event of eating a pickled plum in Wakayama Prefecture. In this arrangement, the variation ratio of the characteristic relating to the player character 41 varies more significantly the larger the enthusiasm rank parameter of Osaka Prefecture is. Specifically, the event result of the Wakayama Prefecture event shown in FIG. 10 occurring when the enthusiasm rank parameter of Osaka Prefecture is "normal"=0 points is that the physical strength ability value parameter that is the characteristic relating to the player character 41 increases 10 points. The event result of the Wakayama Prefecture event shown in FIG. 11 occurring when the enthusiasm rank parameter of Osaka Prefecture is "fever"=1 point is that the physical strength ability value parameter that is the characteristic relating to the player character 41 increases 20 points. The event result of the Wakayama Prefecture event shown in FIG. 12 occurring when the enthusiasm rank parameter of Osaka Prefecture is "high fever"=2 points is that the physical strength ability value parameter that is the characteristic relating to the player character 41 increases 50 points. Specifically, the point increase of the physical strength ability value parameter that is the characteristic relating to the player character 41 varies to 10 points, 20 points, or 50 points according to whether the enthusiasm rank parameter of Osaka Prefecture is "normal"=0 points, "fever"=1 point, or "high fever"=2 points, respectively. In this arrangement, the results of the predetermined event with respect to a game character in the related belonging group determined by the related belonging group event result determining means 60, i.e., the various types of data that include the increased physical strength ability value parameter that is the characteristic relating to the player character 41, are stored in the RAM 12.

The related belonging group event result determining means 60 may also be configured so as to have a function for determining the result of a predetermined event with respect to a game character in the related belonging group according to the related belonging group variable. In this arrangement, the result of a predetermined event with respect to a game character in the related belonging group is determined according to the enthusiasm rank parameter of Wakayama Prefecture, which is the belonging group variable of the administrative division to which the game character belongs. Specifically, the event result of the Wakayama Prefecture event shown in FIG. 10 occurring when the enthusiasm rank parameter of Wakayama Prefecture is "normal"=0 points is that the physical strength ability value parameter that is the characteristic relating to the player character 41 increases 10 points. The event result of the Wakayama Prefecture event shown in FIG. 11 occurring when the enthusiasm rank parameter of Wakayama Prefecture is "fever"=1 point is that the physical strength ability value parameter that is the characteristic relating to the player character 41 increases 20 points. The event result of the Wakayama Prefecture event shown in FIG. 12 occurring when the enthusiasm rank parameter of Wakayama Prefecture is "high fever"=2 points is that the physical strength ability value parameter that is the characteristic relating to the player character 41 increases 50 points. Specifically, the point increase of the physical strength ability value parameter that is the characteristic relating to the player character 41 varies to 10 points, 20 points, or 50 points according to whether the enthusiasm rank parameter of Wakayama Prefecture is "normal"=0 points, "fever"=1 point, or "high fever"=2 points, respectively. In this arrangement, the results of the predetermined event with respect to a game character in the related belonging group determined by the related belonging group event result determining means 60, i.e., the various types of data that include the increased physical strength ability value parameter that is the characteristic relating to the player character 41, are stored in the RAM 12.

In the game program, the belonging group to which the game character belongs is determined by the belonging group determining means 52, the belonging group variable is determined by the belonging group variable determining means 53, the result of a predetermined event with respect to a game character in the belonging group is determined according to the belonging group variable by the belonging group event result determining means 54, and the belonging group variable is varied according to the result of the predetermined event with respect to the game character in the belonging group by the belonging group variable varying means 57. Specifically, the belonging group determining means 52 determines that the administrative division to which the player character 41 belongs is Osaka Prefecture, the belonging group variable determining means 53 determines that the enthusiasm rank parameter of Osaka Prefecture is "normal"=0 points, the belonging group event result determining means 54 determines the result of a predetermined event with respect to the player character 41, and the belonging group variable varying means 57 varies the enthusiasm parameter of Osaka Prefecture according to the result of the predetermined event with respect to the player character 41. In this arrangement, the administrative division or other belonging group, and the enthusiasm rank parameter or other belonging group variable are newly introduced, and the enthusiasm rank parameter or other belonging group variable increases according to the result of a predetermined event in which the player character 41 is named as a pro baseball player in a draft conference event, such as an event in which the team to which the player character 41 belongs wins in the Koshien Tournament event, and the player character is named as a pro baseball player in the draft conference event. Since naming of the player character 41 as a pro baseball player in the draft conference event is a condition for finishing the game, when one player character 41 becomes a pro baseball player, and the game is finished, if the player selects the same Osaka Prefecture in the next game as in the previous game, the enthusiasm rank parameter of Osaka Prefecture is increased from "normal"=0 points to "fever"=1 point. Since the enthusiasm rank parameter is a parameter for indicating the degree of influence that the administrative division has on the player character 41 belonging to the administrative division, the degree of influence exerted by the administrative division on the player character 41 belonging to the administrative division increases when the enthusiasm rank parameter of the re-selected Osaka Prefecture increases, and an environment can therefore be obtained in which the player can develop a new player character more easily than in the previous game. Consequently, since the player can obtain the benefit of an increased enthusiasm rank parameter for having finished the previous game, the player character is no longer developed from the beginning in the same type of environment as the previous game regardless of the fact that the previous game was finished, as in the conventional game, and the fun of the game is increased. Furthermore, the player can also increase the enthusiasm rank parameter of each administrative division, and a new, conventionally unavailable game objective can be obtained in which player characters that newly enter the team every following year, for example, are played in an improved environment created by the player, and the player can therefore continue to build better environments for the player characters. Specifically, a game can be provided that induces the player to play repeatedly.

Furthermore, since the result of a predetermined event is determined by the belonging group event result determining means 54 according to the enthusiasm rank parameter that is the belonging group variable, i.e., since the variation ratio of a characteristic relating to the player character, or a characteristic relating to the team or administrative division is varied according to the enthusiasm rank parameter, the team objective of increasing the enthusiasm rank parameter of each administrative division is more clearly defined, and the player can therefore be induced to play the game repeatedly.

Overview of Television Monitor Display Screens in the Baseball Game

The specific details of the display screens displayed on the television monitor 20 in the baseball game will next be described using the display screens shown in FIGS. 3 through 12.

Figure 3:
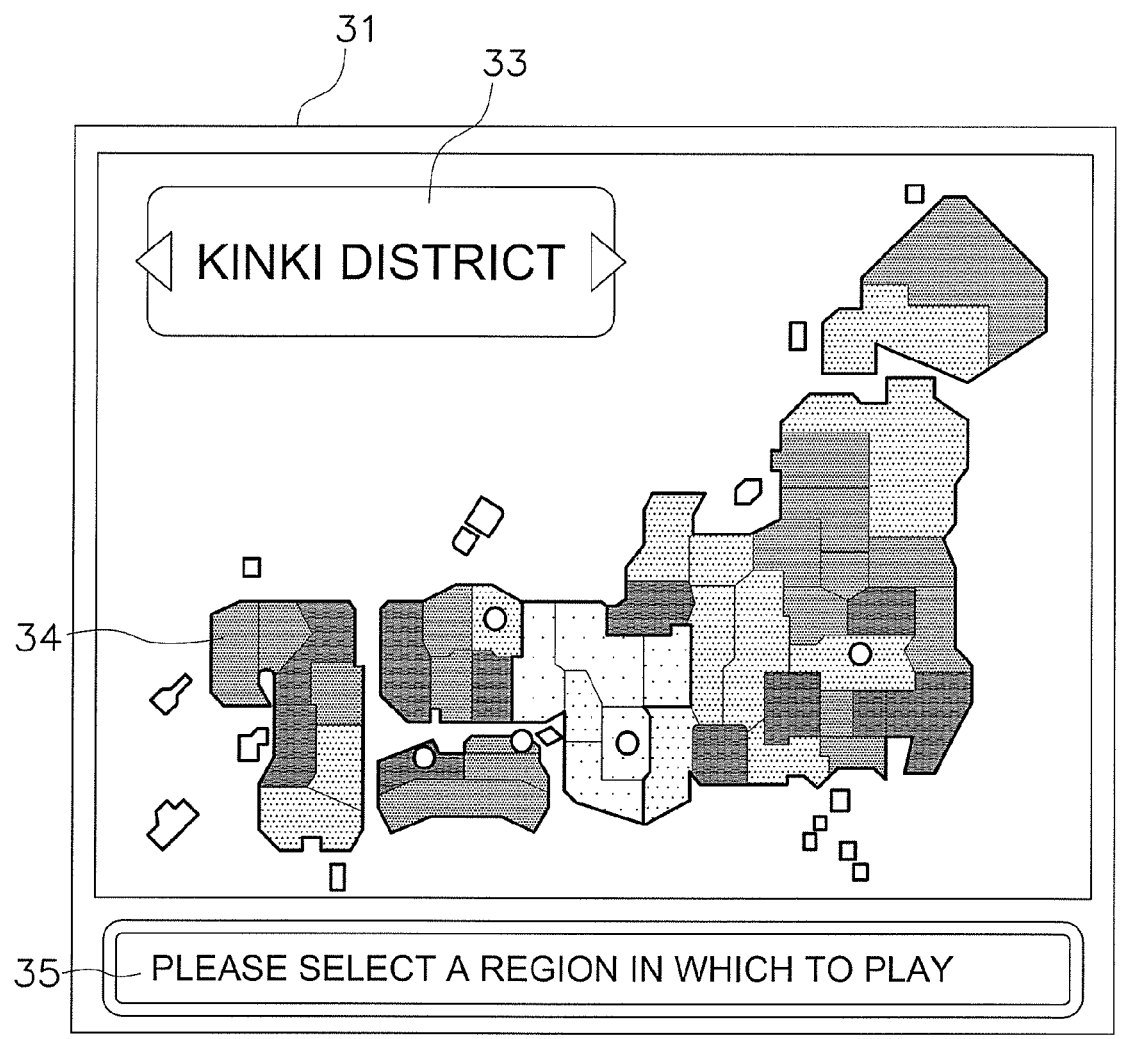
FIG. 3 is a television monitor view showing the region selection screen.
Figure 4:
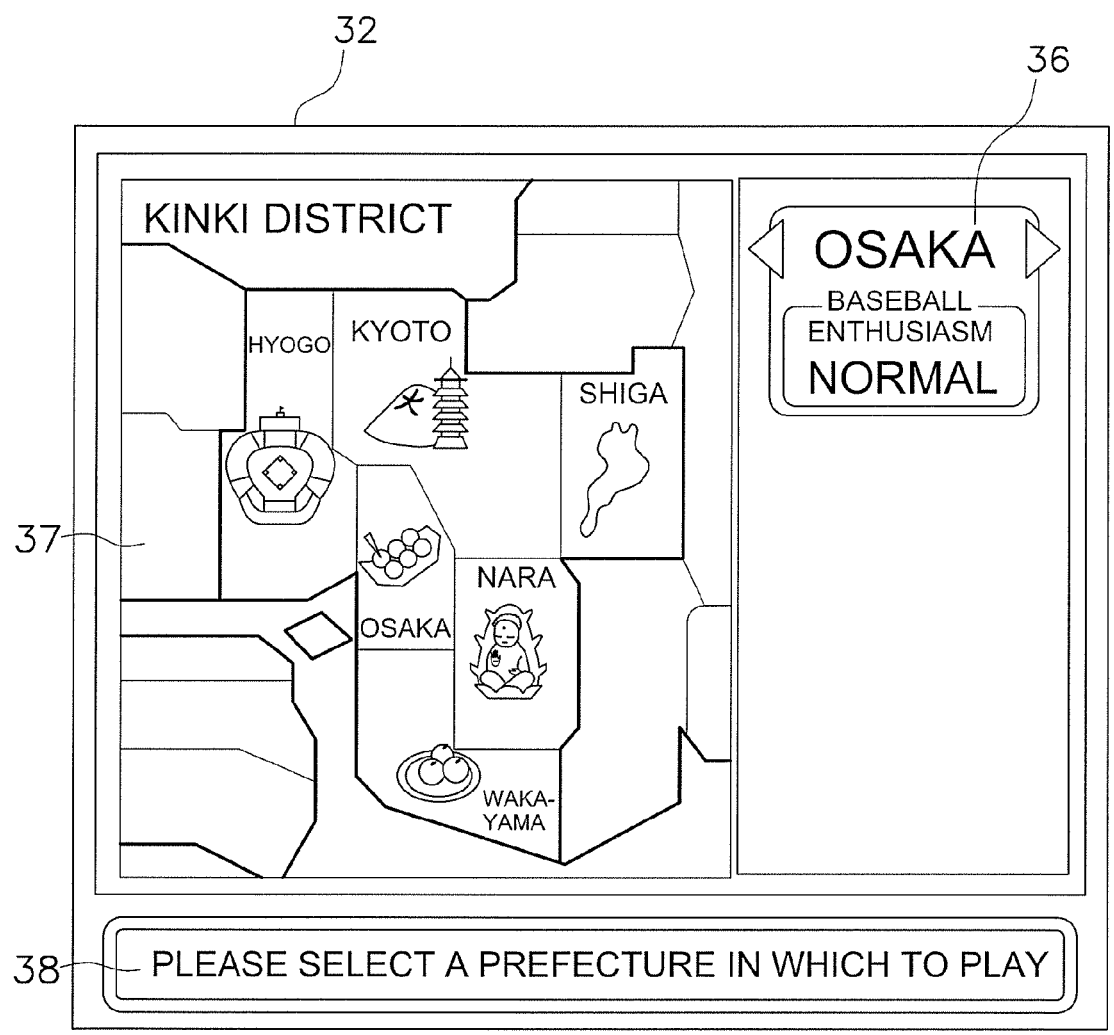
FIG. 4 is a television monitor view showing the administrative division selection screen.
Figure 5:
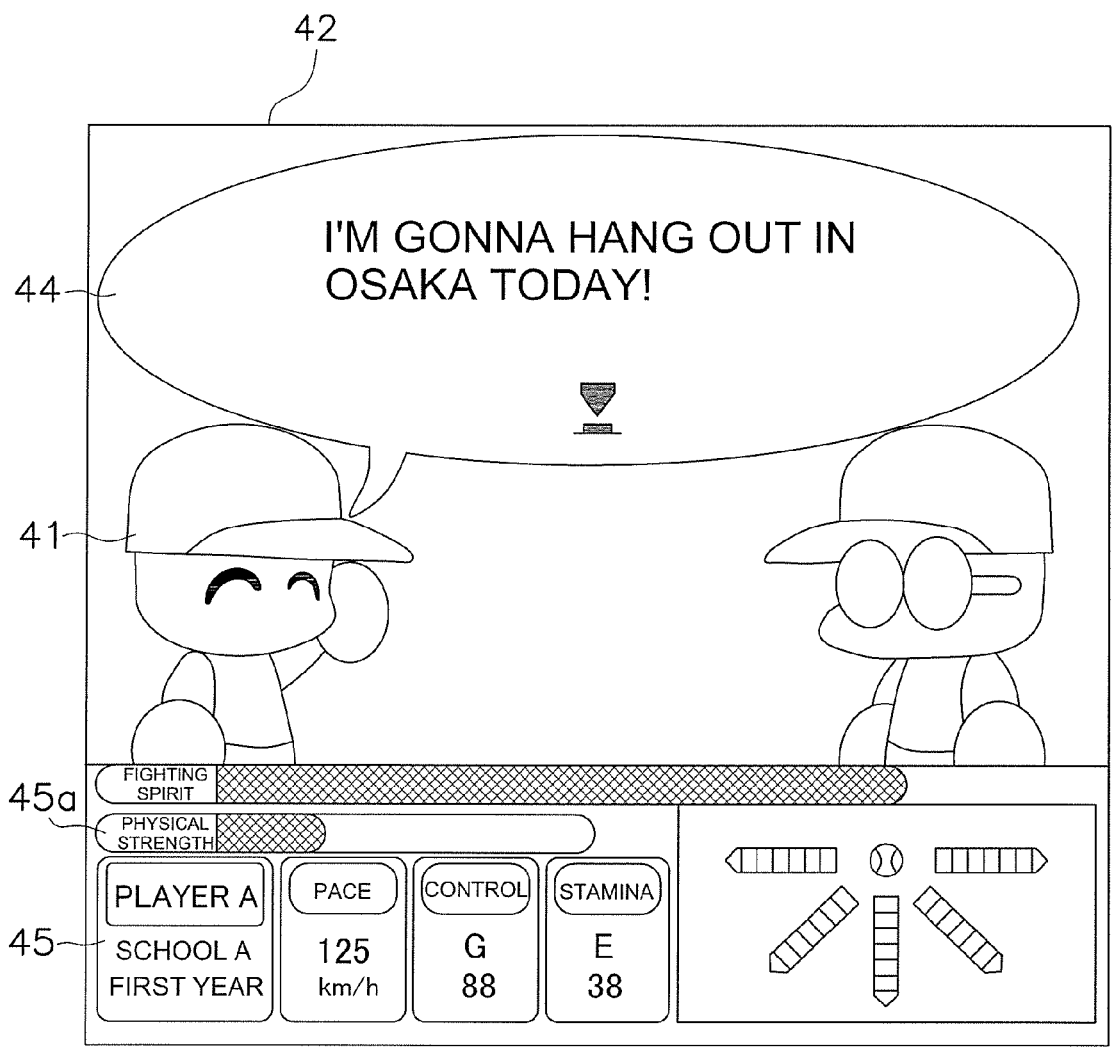
FIG. 5 is a television monitor view showing an event initiation display screen when an Osaka Prefecture event of eating octopus dumplings occurs.
Figure 6:
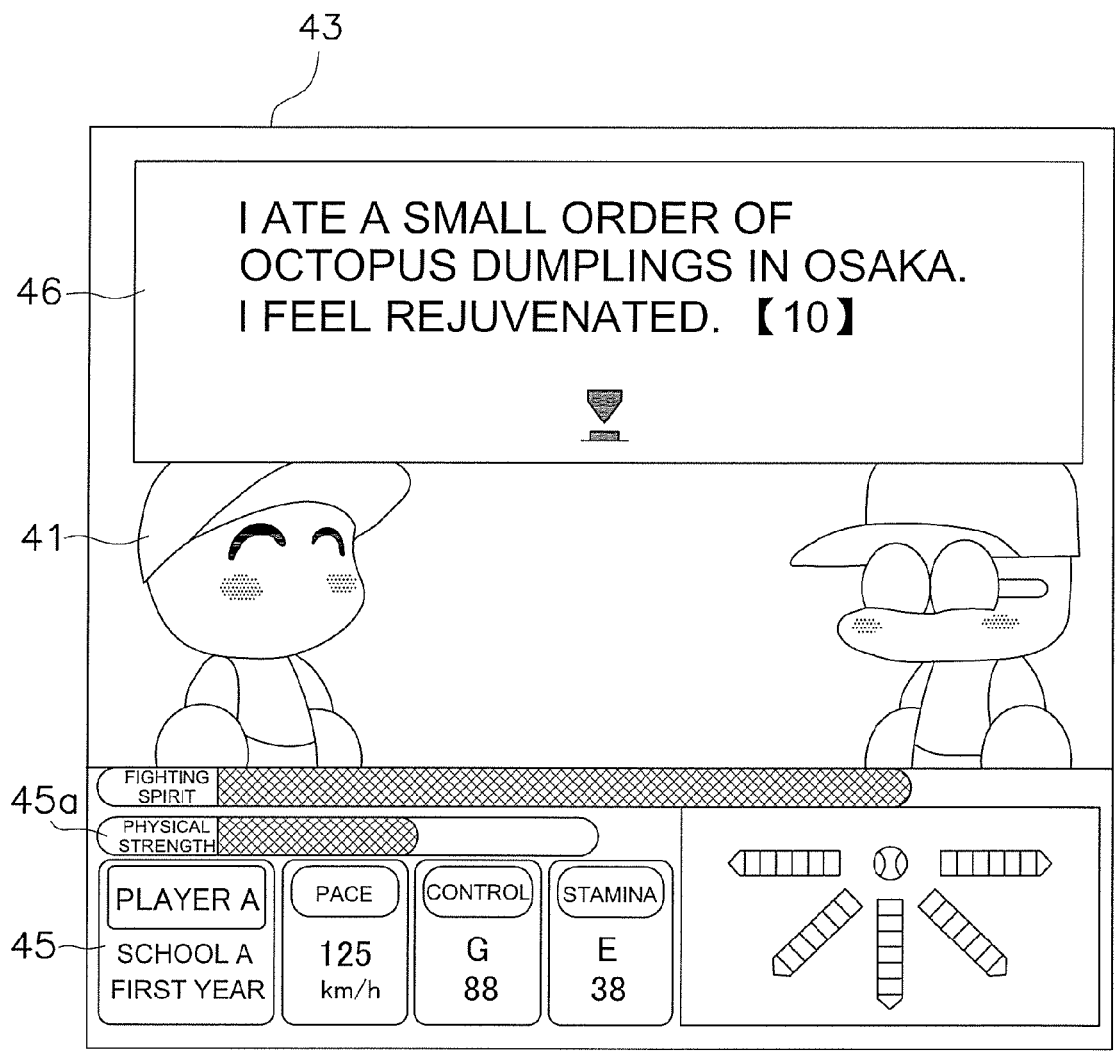
FIG. 6 is a television monitor view showing an event result display screen when the Osaka Prefecture event occurs in a case in which the enthusiasm rank parameter is "normal;"
Figure 7:
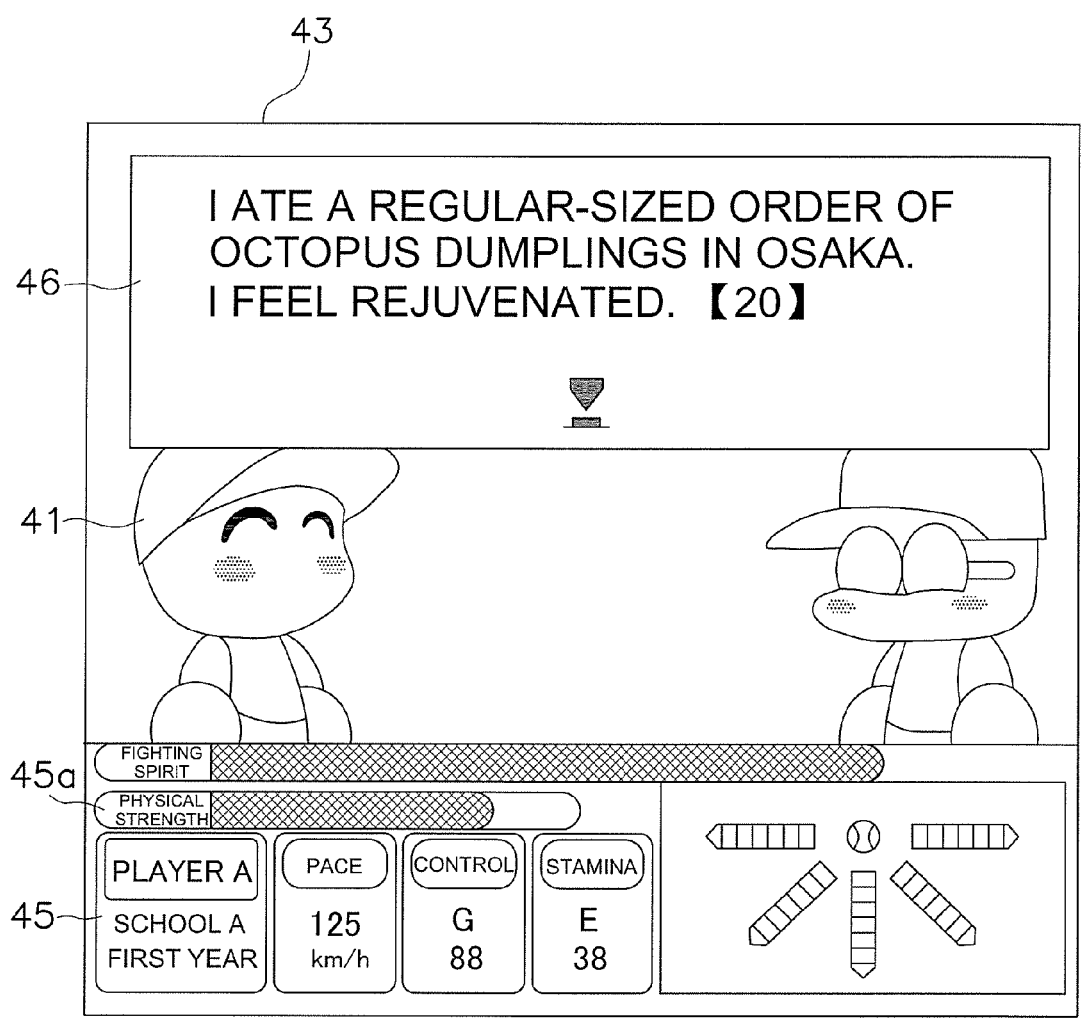
FIG. 7 is a television monitor view showing an event result display screen when the Osaka Prefecture event occurs in a case in which the enthusiasm rank parameter is "fever;"
Figure 8:
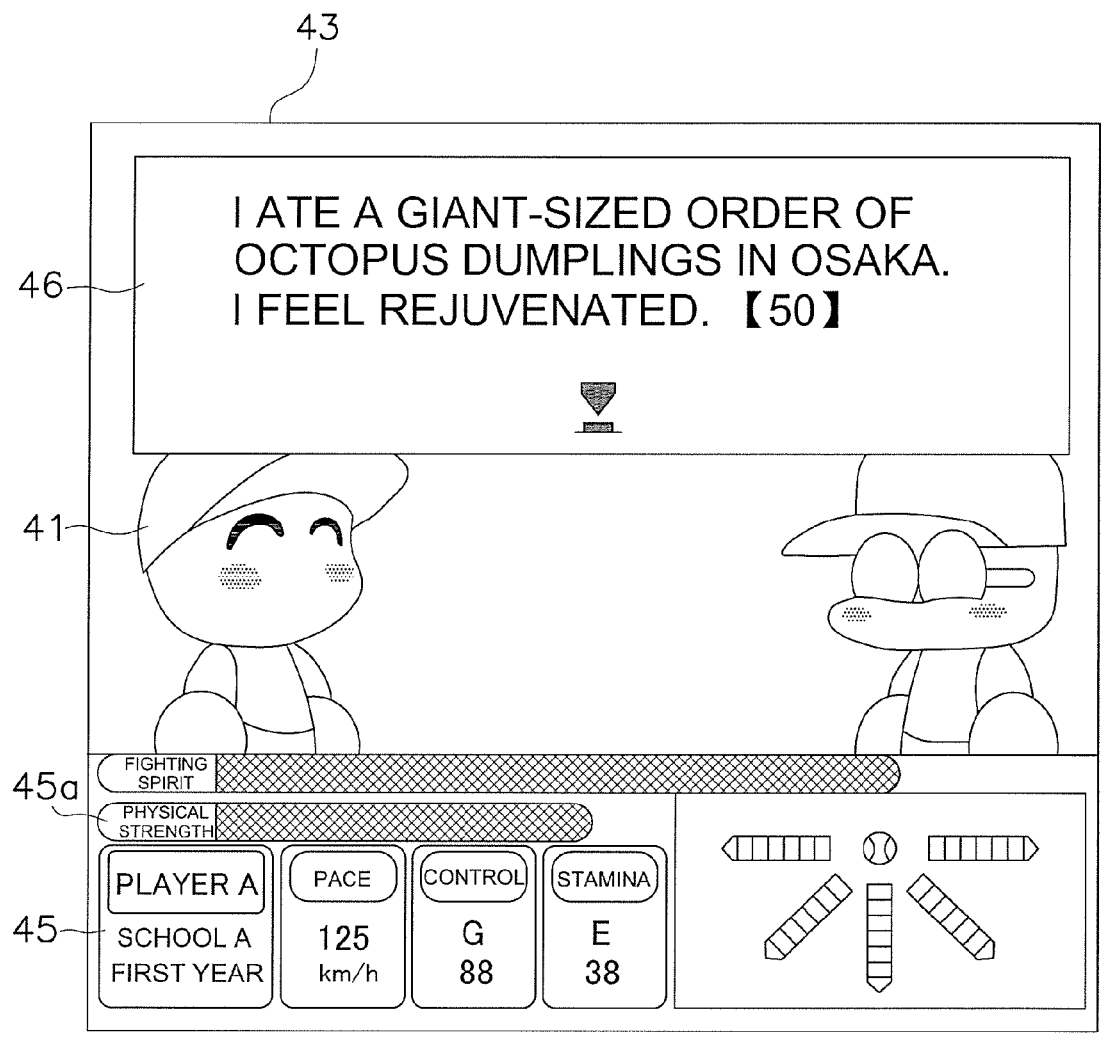
FIG. 8 is a television monitor view showing an event result display screen when the Osaka Prefecture event occurs in a case in which the enthusiasm rank parameter is "high fever;"
Figure 9:
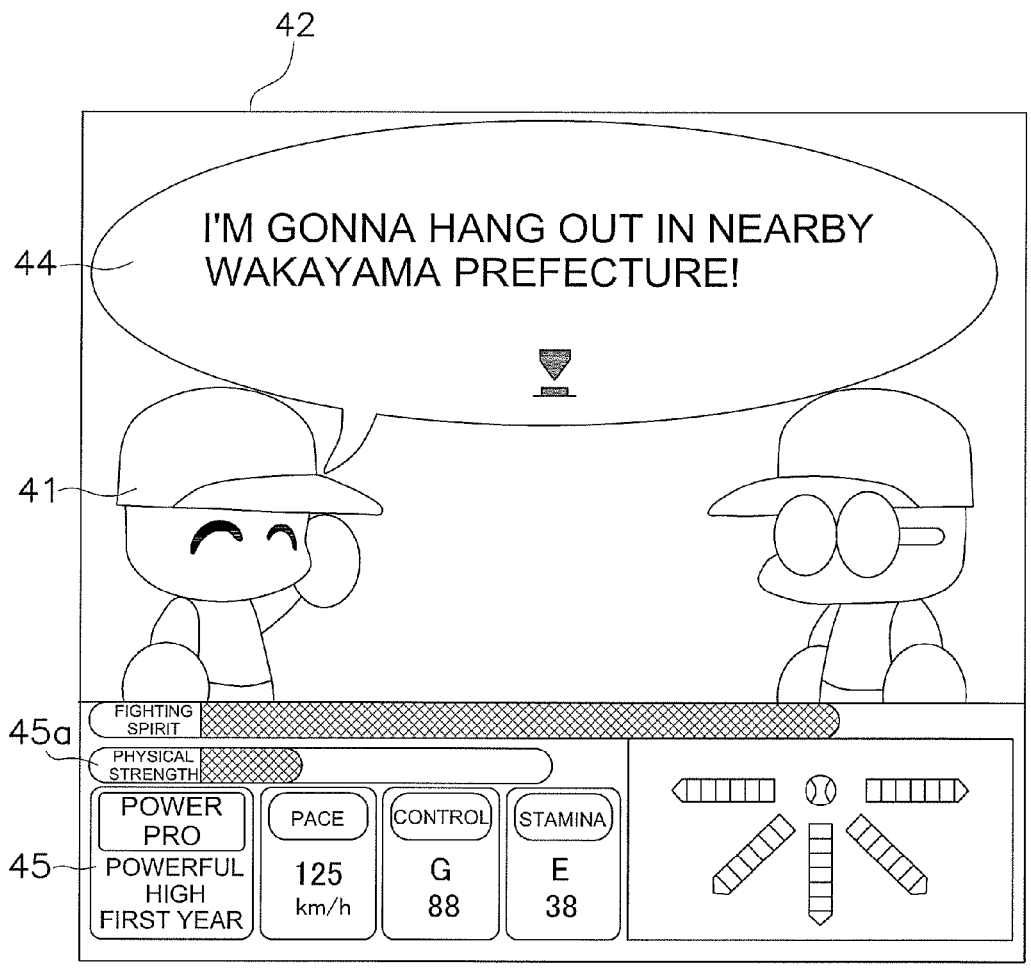
FIG. 9 is a television monitor view showing an event initiation display screen when an event of Wakayama Prefecture, which is a prefecture adjacent to Osaka Prefecture, occurs.
Figure 10:
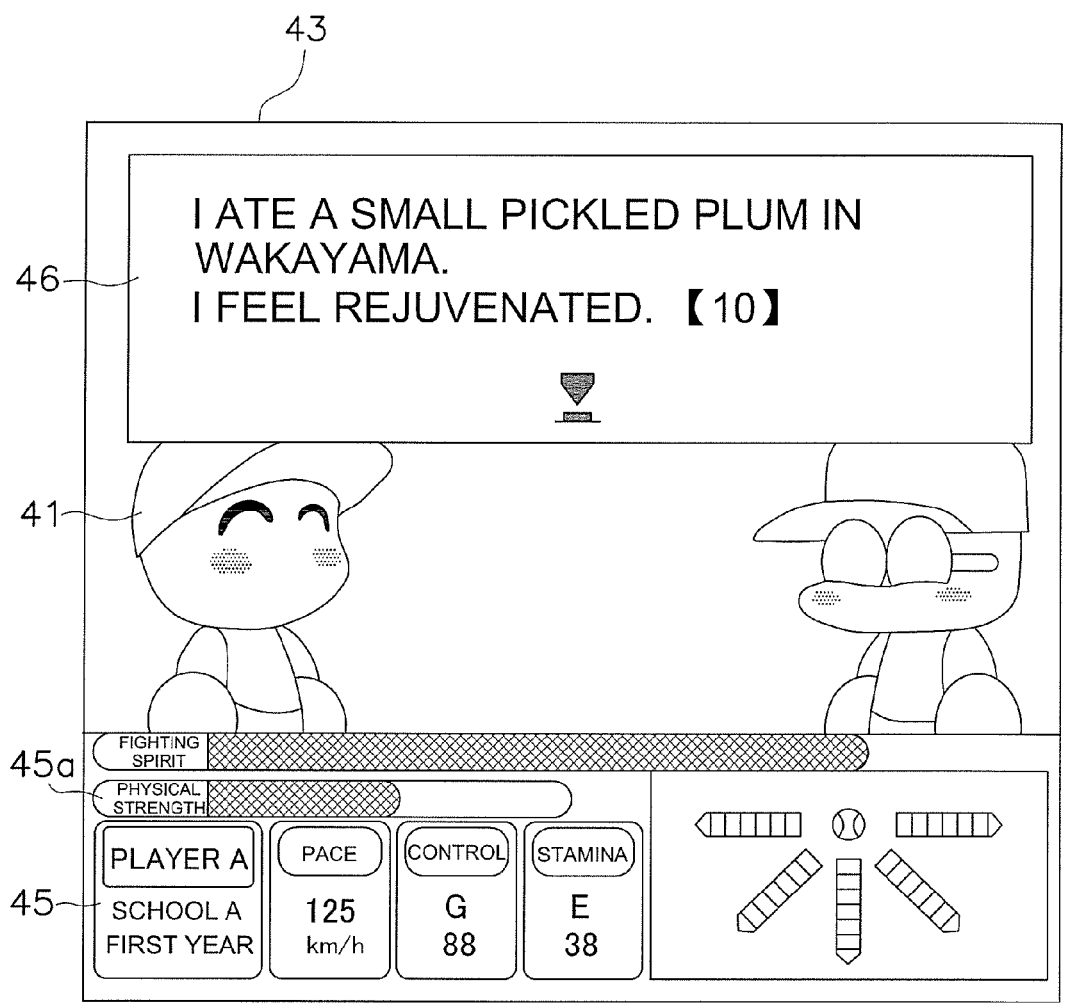
FIG. 10 is a television monitor view showing an event result display screen when the Wakayama Prefecture event occurs in a case in which the enthusiasm parameter is "normal;"
Figure 11:
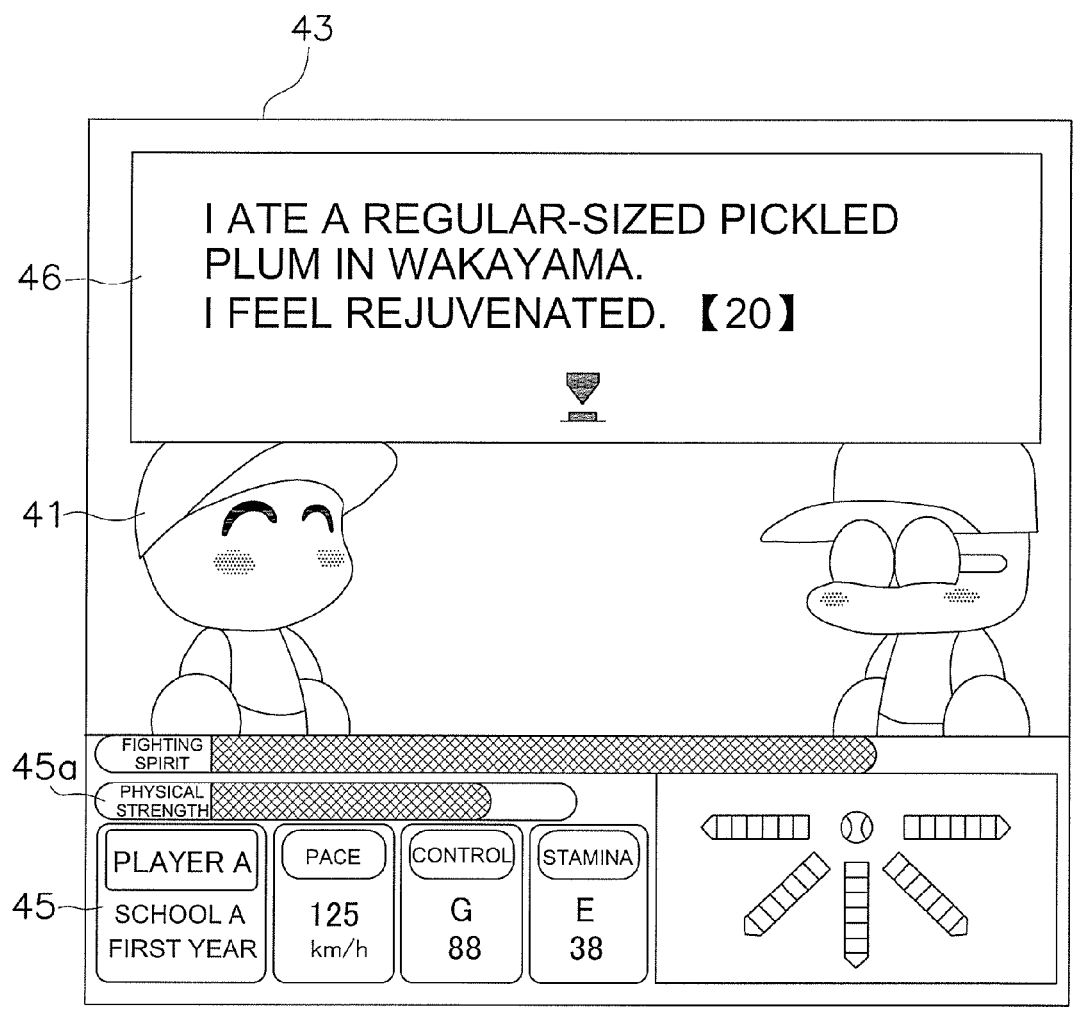
FIG. 11 is a television monitor view showing an event result display screen when the Wakayama Prefecture event occurs in a case in which the enthusiasm parameter is "fever;"
Figure 12:
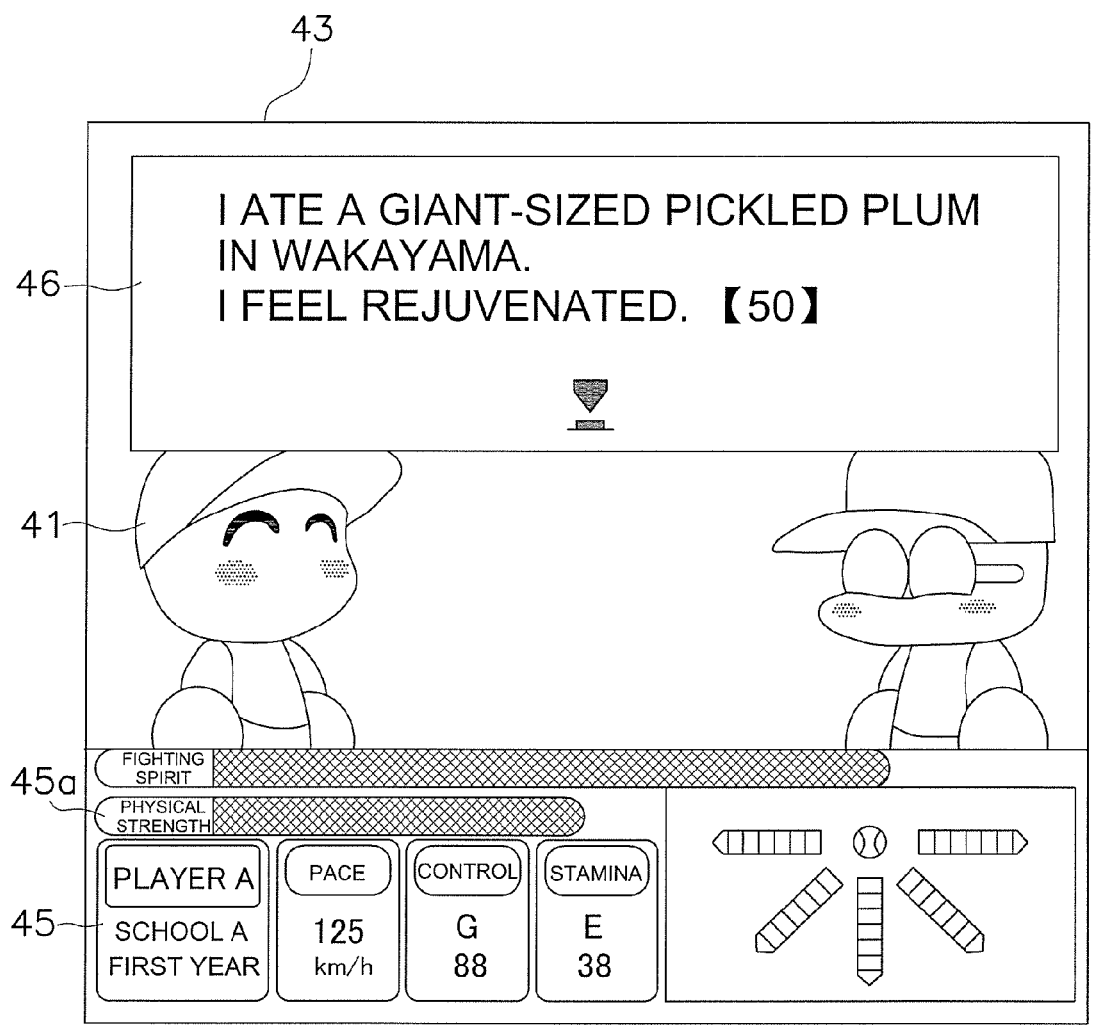
FIG. 12 is a television monitor view showing an event result display screen when the Wakayama Prefecture event occurs in a case in which the enthusiasm parameter is "high fever;"

In the present baseball game, a game is implemented in which the player character 41 is developed by performing events relating to the player character 41 selected by the player, as shown in FIGS. 5 through 12. In such a baseball game, the region selection screen 31 shown in FIG. 3 is a display screen for selecting the region that includes the administrative division to which the player character 41 belongs. The administrative division selection screen 32 shown in FIG. 4 is a display screen for selecting the administrative division to which the player character 41 belongs. The event initiation display screens 42 shown in FIGS. 5 and 9 are display screens that are shown when various events are initiated. The event result display screens 43 shown in FIGS. 6 through 8 and FIGS. 10 through 12 are display screens showing the results of various events.

The region selection screen 31 as shown in FIG. 3 is a screen in which an administrative division map of all of Japan is displayed, and has a region name display area 33 positioned at the upper left of the screen, an administrative division map display area 34 positioned so as to cover the entire center portion of the screen, and a command issuing display area 35 positioned below the administrative division map display area 34. Region names by which the country is divided into six districts are displayed in the region name display area 33, and any text display is displayed that is selected from among Hokkaido/Tohoku District, Kanto District, Kita Shin-Etsu/Tokai District, Kinki District, Chugoku/Shikoku District, and Kyushu/Okinawa District by operating the left key 17L or the right key 17R of the controller 17. In FIG. 3, the text display "Kinki District" is displayed, indicating selection of the Kinki District. The administrative division map display area 34 is a graphic display depicting the administrative divisions of all of Japan, and the administrative divisions are color-coded according to the enthusiasm rank parameter so that an administrative division is shown in green when the enthusiasm rank parameter is "normal" 0 points, yellowish green when the enthusiasm rank parameter is "fever"=1 point, and orange when the enthusiasm rank parameter is "high fever"=2 points. For example, the Kinki District prefectures of Osaka, Hyogo, Kyoto, Nara, Shiga, and Wakayama are shown in green, indicating an enthusiasm rank parameter of "normal"=0 points. The selected region is indicated in an overall muted color scheme to distinguish from the non-selected regions. In FIG. 3, since the Kinki District is selected, the Kinki District prefectures of Osaka, Hyogo, Kyoto, Nara, Shiga, and Wakayama are shown in a more muted color scheme than the other regions. A text display of "Please select a region in which to play" that indicates issuing of an operation as to what type of operation the player is to perform is displayed in the command issuing display area 35.

Figure 16:
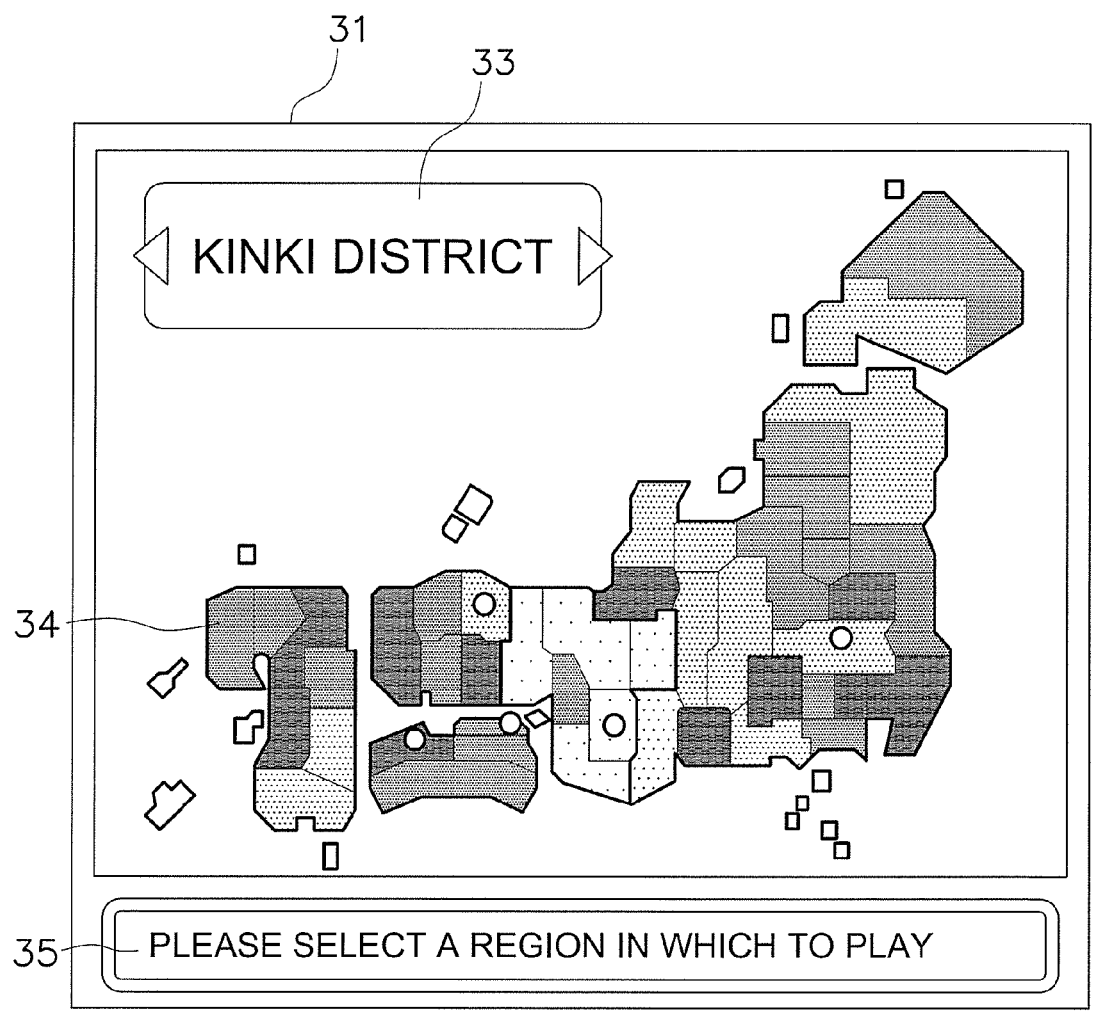
FIG. 16 is a television monitor view showing the region selection screen when the enthusiasm rank parameter has increased to "fever;"
Figure 17:
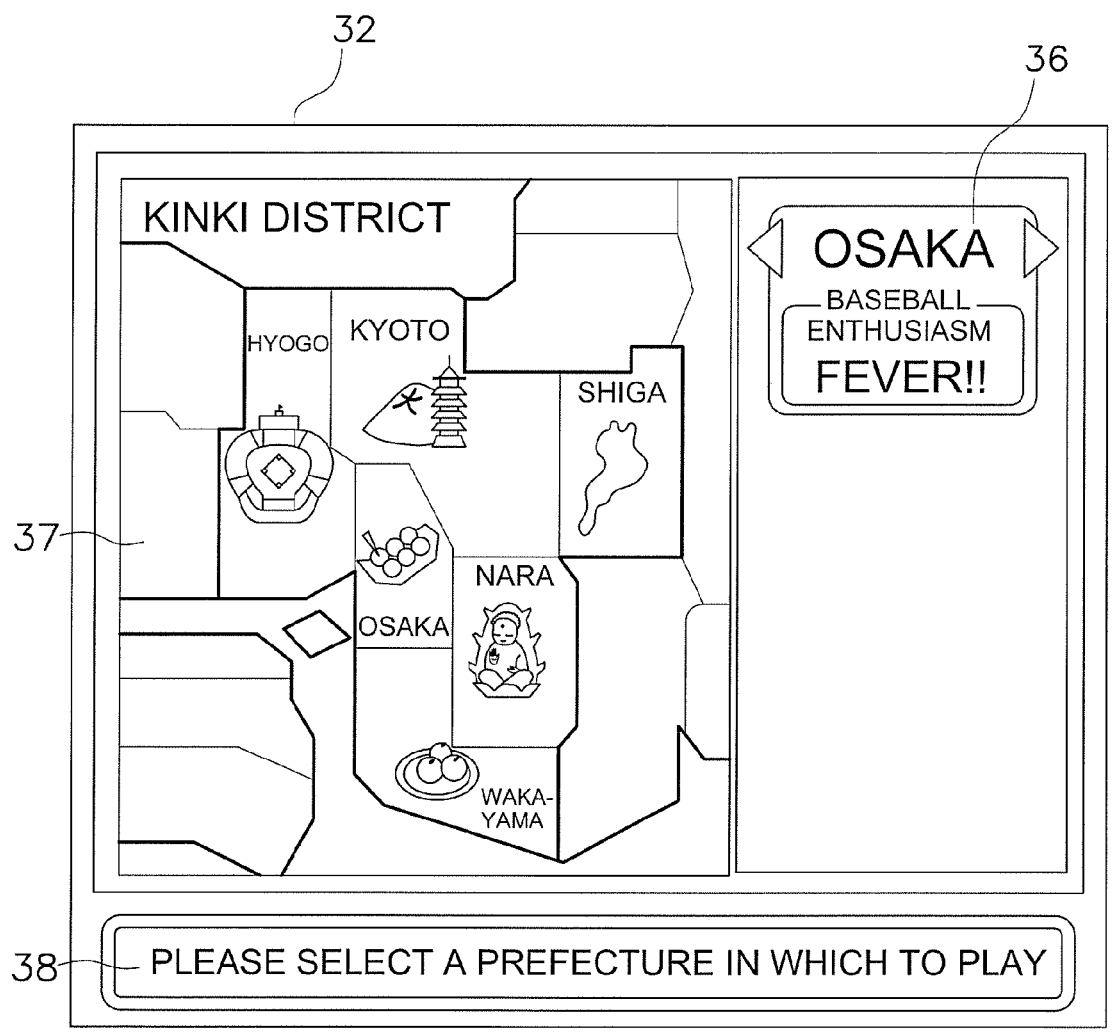
FIG. 17 is a television monitor view showing the administrative division selection screen when the enthusiasm rank parameter has increased to "fever;"
Figure 18:
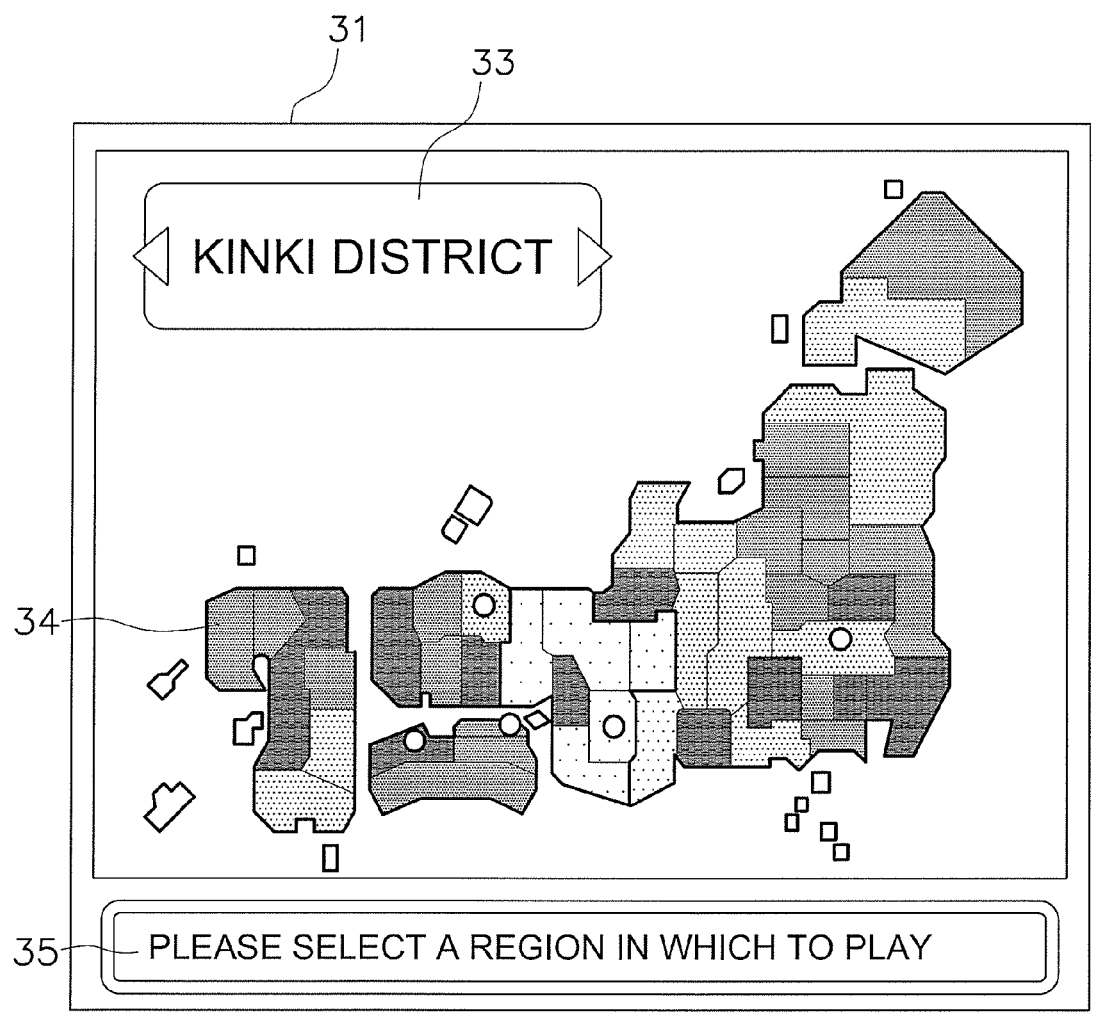
FIG. 18 is a television monitor view showing the region selection screen when the enthusiasm rank parameter has increased to "high fever;"
Figures 19, 20:
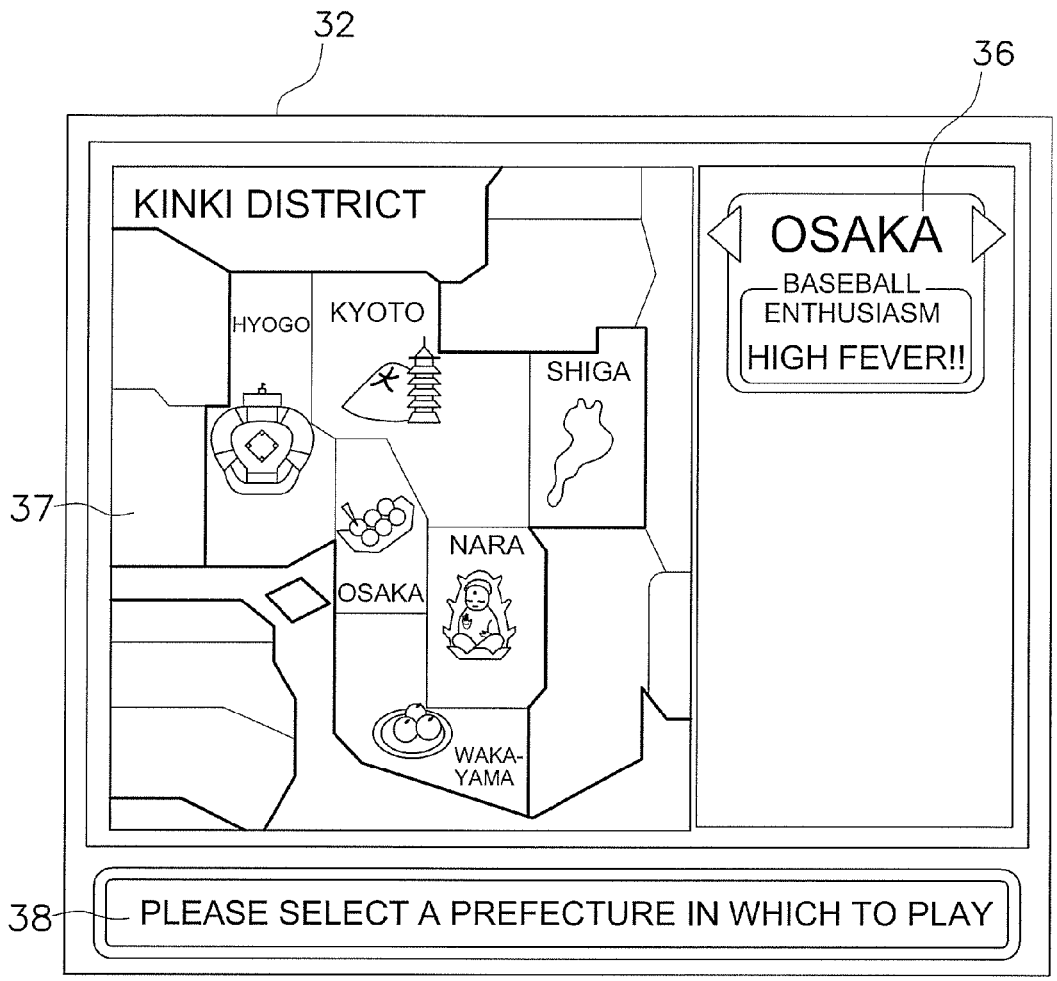
FIG. 19 is a television monitor view showing the administrative division selection screen when the enthusiasm rank parameter has increased to "high fever.
" and FIG. 20 is a table showing the enthusiasm rank parameters and the probabilities of occurrence of belonging group events and related belonging group events.

The administrative division selection screen 32 as shown in FIG. 4 is a screen in which the administrative division map (Kinki District in FIG. 4) of the region selected in the region selection screen 31 is displayed in enlarged fashion, and has a prefecture name display area 36 positioned at the upper right of the screen, an administrative division map enlargement display area 37 positioned so as to fill the entire left side of the screen, and a command issuing display area 38 positioned below the administrative division map enlargement display area 37. The name and enthusiasm rank parameter of the selected prefecture, and a text display showing any of the Kinki District prefectures of Osaka, Hyogo, Kyoto, Nara, Shiga, and Wakayama, for example, selected by operating the left key 17L or the right key 17R of the controller 17 are displayed in the prefecture name display area 36. In FIG. 4, the text display "Osaka" indicating that Osaka Prefecture is selected, and the text display "Normal" indicating that the enthusiasm rank parameter of Osaka Prefecture is "normal"=0 points are displayed in a vertical arrangement. The administrative division map enlargement display area 37 is a graphic display depicting the prefectures of the selected region, in which text displays showing the names of the prefectures, and graphic displays showing the characteristic objects of the prefectures are displayed. For example, in the Kinki District shown in FIG. 4, graphic displays are displayed that depict octopus dumplings for Osaka Prefecture, Koshien for Hyogo Prefecture, the Daimonji bonfire event for Kyoto Prefecture, a Daibutsu for Nara Prefecture, Lake Biwa for Shiga Prefecture, and pickled plums for Wakayama Prefecture. In the administrative division map enlargement display area 37, the prefectures are color-coded according to the enthusiasm rank parameter in the same manner as in the administrative division map display area 34, and are green when the enthusiasm rank parameter is "normal"=0 points, yellowish green when the enthusiasm rank parameter is "fever"=1 point, and orange when the enthusiasm rank parameter is "high fever"=2 points. For example, the Kinki District prefectures of Osaka, Hyogo, Kyoto, Nara, Shiga, and Wakayama are shown in green, indicating an enthusiasm rank parameter of "normal"=0 points. The selected region is indicated in an overall muted color scheme to distinguish from the non-selected regions. In FIG. 4, since Osaka Prefecture is selected, Osaka Prefecture is shown in a more muted color scheme than the other prefectures of the Kinki District. A text display of "Please select a prefecture in which to play" that indicates issuing of an operation as to what type of operation the player is to perform is displayed in the command issuing display area 38. In FIGS. 3 and 4, since the enthusiasm rank parameter of Osaka Prefecture is "normal"=0 points, Osaka Prefecture is shown in green to indicate the enthusiasm rank parameter of "normal"=0 points, but the display changes to yellowish green as shown in FIGS. 16 and 17 to indicate "fever"=1 point when the enthusiasm rank parameter of Osaka Prefecture is "fever"=1 point, and the display changes to orange as shown in FIGS. 18 and 19 to indicate "high fever"=2 points when the enthusiasm rank parameter of Osaka Prefecture is "high fever"=2 points.

As shown in FIGS. 5 and 9, the event initiation display screen 42 is a display screen showing the initiation of various events, and the event result display screen 43 is a display screen showing the results of various events, as shown in FIGS. 6 through 8 and 10 through 12. In FIGS. 5 and 6 through 8, the event of eating octopus dumplings in the city of Osaka occurs, and the event result of an increase in the physical strength ability value parameter that is the characteristic relating to the player character 41 with respect to the event of eating octopus dumplings in the city of Osaka is shown. In FIGS. 9 and 10 through 12, the event of eating a pickled plum in Wakayama Prefecture occurs, and the event result of an increase in the physical strength ability value parameter that is the characteristic relating to the player character 41 with respect to the event of eating a pickled plum in Wakayama Prefecture is shown.

As shown in FIGS. 5 and 9, the event initiation display screen 42 has the player character 41 positioned to the left of the center part of the screen, an event initiation detail display area 44 positioned at the top of the screen, and an ability value display area 45 for displaying various ability values that are characteristics relating to the player character 41, positioned at the bottom of the screen. The event initiation detail display area 44 is a text display displayed in a dialogue balloon-shaped frame for spoken lines of the player character 41 above the player character 41. Specifically, the text display "I'm gonna hang out in Osaka today! " is displayed in the event initiation detail display area 44 in FIG. 5, and the text display "I'm gonna hang out in nearby Wakayama Prefecture! " is displayed in the event initiation detail display area 44 in FIG. 9. In the ability value display area 45, text displays or bar-graph-shaped graphic displays indicating various ability value parameters of the player character 41 are displayed, and the fighting spirit, player name, belonging school name, academic year, pace, control, stamina, favorite pitch, and the like of the player character 41 are displayed. In this instance, the fighting spirit of the player character 41 is at maximum, the player name is Player A, the belonging school name is High School A, the academic year is first year, the pace is 125 km/h, the control is G and 88 points, the stamina is E and 38 points, and the favorite pitch is "none." In the ability value display area 45, a physical strength value 45a composed of a bar-graph-shaped graphic display indicating the ability value parameter of physical strength of the player character 41 is displayed below the bar-graph-shaped graphic display that indicates the fighting spirit of the player character 41.

The event result display screen 43 has the player character 41 positioned to the left of the center part of the screen, an event result detail display area 46 positioned at the top of the screen, and the ability value display area 45 for displaying various ability values that are characteristics relating to the player character 41, positioned at the bottom of the screen as shown in FIGS. 6 through 8 and 10 through 12. The event result detail display area 46 is a text display shown within a rectangular frame, in which the results of various events are displayed.

Specifically, the text display "I ate a small order of octopus dumplings in Osaka. I feel rejuvenated. [10]" is displayed in the event result detail display area 46 in FIG. 6 in order to indicate a 10-point increase in the physical strength ability value parameter as the characteristic relating to the player character 41 as the event result when the event of eating octopus dumplings in Osaka Prefecture occurs in a case in which the enthusiasm rank parameter is "normal"=0 points. The number "[10]" at the end of this text display corresponds to the ability value parameter. At this time, the physical strength value 45a of the ability value display area 45 is displayed so that the bar-graph-shaped graphic display lengthens an amount commensurate with a 10-point increase to the right in FIG. 6. The text display "I ate a regular-sized order of octopus dumplings in Osaka. I feel rejuvenated. [20]" is displayed in the event result detail display area 46 in FIG. 7 in order to indicate a 20-point increase in the physical strength ability value parameter as the characteristic relating to the player character 41 as the event result when the event of eating octopus dumplings in Osaka Prefecture occurs in a case in which the enthusiasm rank parameter is "fever"=1 point. The number "[20]" at the end of this text display corresponds to the ability value parameter. At this time, the physical strength value 45a of the ability value display area 45 is displayed so that the bar-graph-shaped graphic display further lengthens an amount commensurate with a 20-point increase to the right in FIG. 7. The text display "I ate a giant-sized order of octopus dumplings in Osaka. I feel rejuvenated. [50]" is displayed in the event result detail display area 46 in FIG. 8 in order to indicate a 50-point increase in the physical strength ability value parameter as the characteristic relating to the player character 41 as the event result when the event of eating octopus dumplings in Osaka Prefecture occurs in a case in which the enthusiasm rank parameter is "high fever"=2 points. The number "[50]" at the end of this text display corresponds to the ability value parameter. At this time, the physical strength value 45a of the ability value display area 45 is displayed so that the bar-graph-shaped graphic display further lengthens an amount commensurate with a 50-point increase to the right in FIG. 8.

The text display "I ate a small pickled plum in Wakayama Prefecture. I feel rejuvenated. [10] " is displayed in the event result detail display area 46 in FIG. 10 in order to indicate a 10-point increase in the physical strength ability value parameter as the characteristic relating to the player character 41 as the event result when the event of eating a pickled plum in Wakayama Prefecture occurs in a case in which the enthusiasm rank parameter is "normal"=0 points. At this time, the physical strength value 45a of the ability value display area 45 is displayed so that the bar-graph-shaped graphic display lengthens an amount commensurate with a 10-point increase to the right in FIG. 10. The text display "I ate a regular-sized pickled plum in Wakayama Prefecture. I feel rejuvenated. [20]" is displayed in the event result detail display area 46 in FIG. 11 in order to indicate a 20-point increase in the physical strength ability value parameter as the characteristic relating to the player character 41 as the event result when the event of eating a pickled plum in Wakayama Prefecture occurs in a case in which the enthusiasm rank parameter is "fever"=1 point. At this time, the physical strength value 45a of the ability value display area 45 is displayed so that the bar-graph-shaped graphic display further lengthens an amount commensurate with a 20-point increase to the right in FIG. 11. The text display "I ate a giant-sized pickled plum in Wakayama Prefecture. I feel rejuvenated. [50]" is displayed in the event result detail display area 46 in FIG. 12 in order to indicate a 50-point increase in the physical strength ability value parameter as the characteristic relating to the player character 41 as the event result when the event of eating a pickled plum in Wakayama Prefecture occurs in a case in which the enthusiasm rank parameter is "high fever"=2 points. At this time, the physical strength value 45a of the ability value display area 45 is displayed so that the bar-graph-shaped graphic display further lengthens an amount commensurate with a 50-point increase to the right in FIG. 12.

Figure 14:
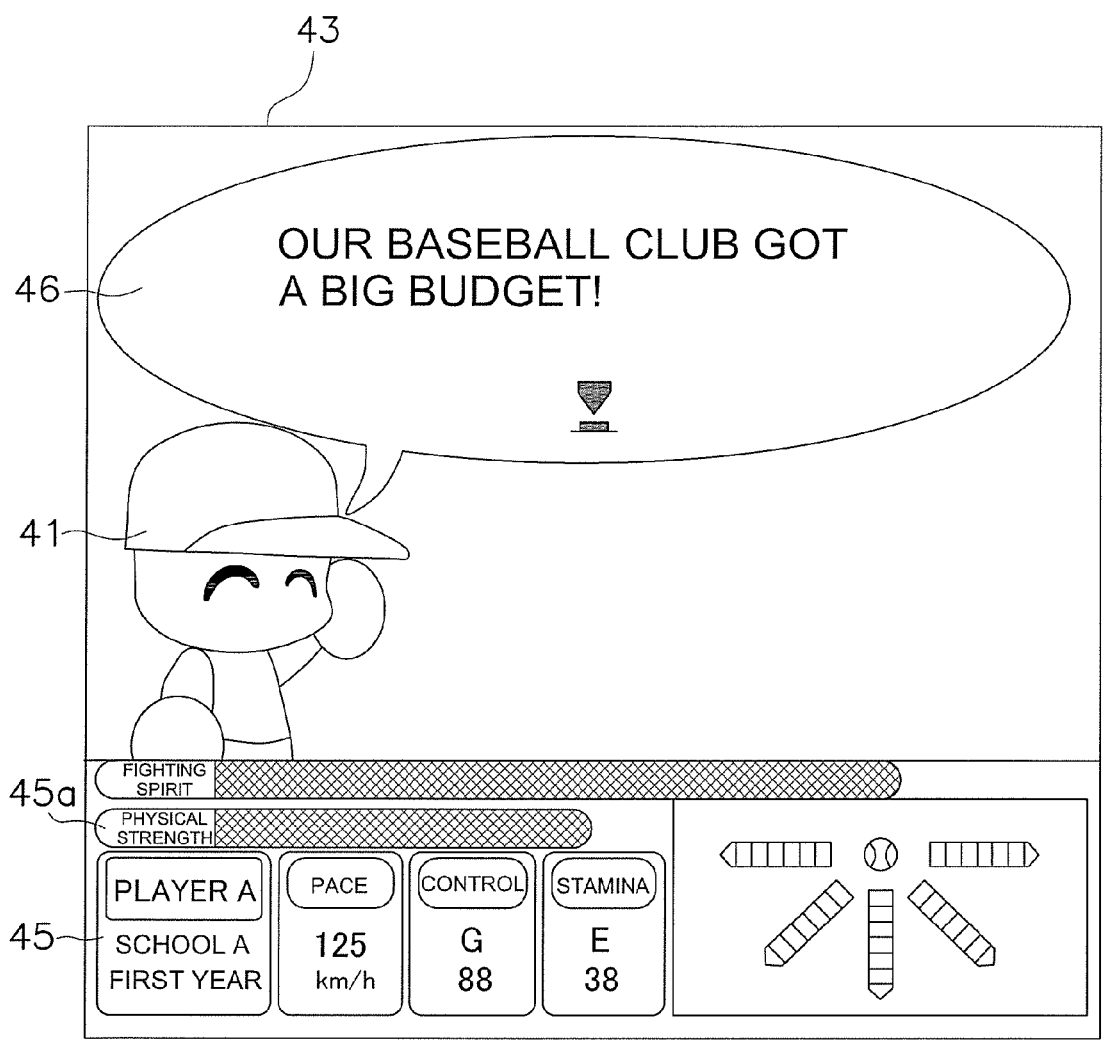
FIG. 14 is a television monitor view showing an event initiation display screen when the Osaka Prefecture event of an increasing budget occurs.

When the event of a budget increase of the baseball club occurs, the text display "Our baseball club got a big budget!" is displayed in the event result detail display area 46, as shown in FIG. 14.

Processing Flow During Execution of the Parameter Variation Processing System for Various Events in the Baseball Game The parameter variation processing system for various events in the baseball game of the present embodiment, particularly the parameter variation processing system for operating the player character with respect to various events, will be described using the flowchart in FIG. 13, and the parameter variation processing system for operating the belonging group with respect to various events will be described using the flowchart in FIG. 15.

Figure 13:
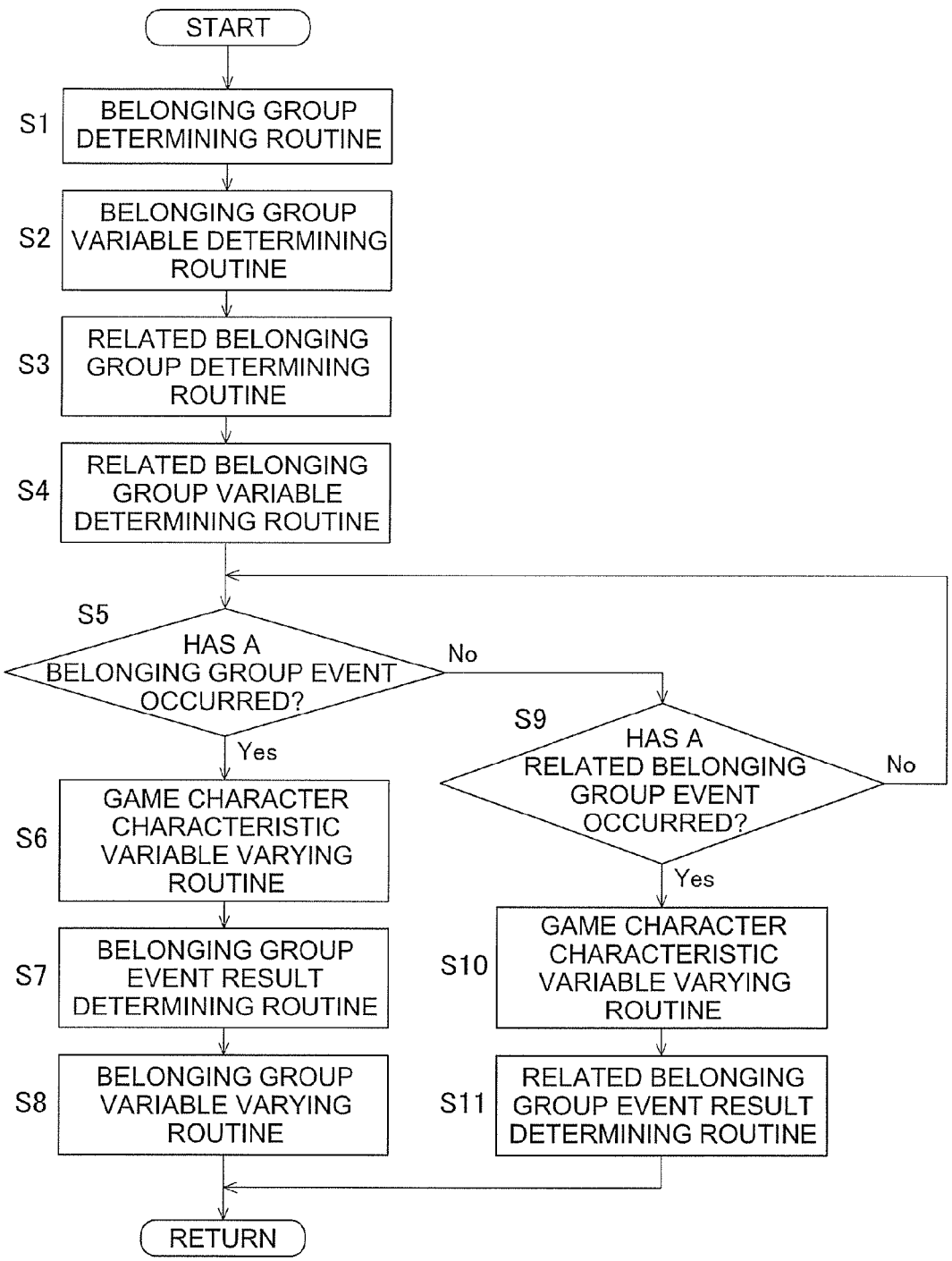
FIG. 13 is a flowchart showing the parameter variation routines applied to a player character with respect to the various events in the baseball game.

First, as shown in FIG. 13, a belonging group determining routing is performed for determining the belonging group to which the game character belongs (S1).

In the belonging group determining routine of step S1, the belonging group to which the game character belongs is determined. The game character herein is the player character 41 selected by the player. The belonging group to which the game character belongs is a geographic region, an administrative division of Japan, a school, a team, or other group to which the player character belongs that is selected by the player. Specifically, when the belonging group to which the game character belongs is an administrative division of Japan, the administrative division that is the belonging group to which the player character 41 belongs is determined as Osaka Prefecture (see FIG. 4). When the belonging group to which the player character 41 belongs is determined in the belonging group determining routine of step S1, the process proceeds to a belonging group variable determining routine for determining a belonging group variable of an initial state at the time of a first game, and determining the belonging group variable determined in a preceding game at the time of a second or subsequent game with respect to a belonging group variable for indicating a degree of influence to which development of the game character belonging to the belonging group is influenced in association with the belonging group (S2).

In the belonging group variable determining routine of step S2, a belonging group variable of an initial state is determined at the time of a first game, and the belonging group variable determined in a preceding game is determined at the time of a second or subsequent game with respect to a belonging group variable for indicating a degree of influence to which development of the game character belonging to the belonging group is influenced in association with the belonging group. The belonging group variable herein is a parameter for indicating a degree of influence to which the belonging group influences the game character that belongs to the belonging group, and is an enthusiasm rank parameter, for example, for influencing the player character belonging to the administrative division. The enthusiasm rank parameter has three ranks that include "normal," "fever," and "high fever," for example, and the degree of influence on the player character belonging to the administrative division increases the higher the number of points, wherein "normal"=0 points, "fever"=1 point, and "high fever"=2 points. In a case in which the enthusiasm rank parameter as the belonging group variable is "fever"=1 point, the degree of influence on the player character belonging to the administrative division is higher than in a case in which the enthusiasm rank parameter is "normal"=0 points. In this instance, the enthusiasm rank parameter that is the belonging group variable of Osaka Prefecture, which is the belonging group, is determined to be "normal"=0, for example (see FIGS. 3 and 4). When the enthusiasm rank parameter that is the belonging group variable of Osaka Prefecture is determined in the belonging group variable determining routine of step S2, the process proceeds to a related belonging group determining routine of step S3 for determining a related belonging group that is related to the belonging group to which the game character belongs from among a plurality of belonging groups (S3).

In the related belonging group determining routine of step S3, a related belonging group that is related to the belonging group to which the game character belongs is determined from among a plurality of belonging groups. The related belonging group that is related to the belonging group to which the game character belongs is a group that satisfies predetermined conditions relating to the belonging group to which the game character belongs, and is an administrative division adjacent to the administrative division to which the game character belongs. Administrative divisions to which the game character may belong include Hyogo Prefecture, Kyoto Prefecture, Nara Prefecture, and Wakayama Prefecture (see FIG. 4). When the related belonging group that is related to the belonging group to which the player character 41 belongs is determined in the related belonging group determining routine of step S3, the process proceeds to a related belonging group variable determining routine for determining a related belonging group variable for indicating a degree of influence to which development of the game character belonging to the related belonging group is influenced in association with the related belonging group (S4).

In the related belonging group variable determining routine of step S4, a related belonging group variable is determined for indicating a degree of influence to which development of the game character belonging to the related belonging group is influenced in association with the related belonging group. In this arrangement, the related belonging group variable is a parameter for indicating the degree of influence exerted by related belonging group on the game character belonging to the related belonging group, and is different parameter than the belonging group variable of the belonging group to which the player character 41 belongs. In this instance, the enthusiasm rank parameter that is the related belonging group variable of Hyogo Prefecture, Kyoto Prefecture, Nara Prefecture, and Wakayama Prefecture is determined to be "normal"=0 points, which indicates the initial state (see FIGS. 3 and 4). When the enthusiasm rank parameter that is the related belonging group variable of Hyogo Prefecture, Kyoto Prefecture, Nara Prefecture, and Wakayama Prefecture is determined in the related belonging group variable determining routine of step S4, a determination is made as to whether a belonging group event has occurred (S5).

When a determination is made in step S5 that a belonging group event has occurred, the process proceeds to a game character characteristic variable varying routine (S6), and when a determination is made in step S5 that a belonging group event has not occurred, a determination is made as to whether a related belonging group event has occurred (S9). When a determination is made in step S9 that a related belonging group vent has occurred, the process proceeds to a game character characteristic variable varying routine (S10), and when a determination is made in step S9 that a related belonging group event has not occurred, the process returns to step S5.

The game character characteristic variable varying routine of step S6 has a function for varying the variation ratio of a predetermined characteristic relating to the game character according to the belonging group variable. The variation ratio of a predetermined characteristic relating to the game character is varied according to the belonging group variable by the game character characteristic variable varying routine of step S6. The result of a predetermined event with respect to a game character in the belonging group is the result of variation of a characteristic relating to the player character 41 through an event that relates to the administrative division that is the belonging group. Specifically, when the administrative division that is the belonging group is Osaka Prefecture, the event shown in FIG. 5 of eating octopus dumplings in the city of Osaka occurs, and the increase ratio of the ability value parameter of physical strength as the characteristic relating to the player character 41 varies according to the enthusiasm rank parameter with respect to the event of eating octopus dumplings in the city of Osaka. In this arrangement, the variation ratio of the characteristic relating to the player character 41 varies more significantly the larger the enthusiasm rank parameter is. Specifically, the event result of the Osaka event shown in FIG. 6 occurring when the enthusiasm rank parameter is "normal"=0 points is that the physical strength ability value parameter that is the characteristic relating to the player character 41 increases 10 points. This ability value parameter is displayed as shown in FIG. 6 so as correspond to the number "[10]" at the end of the text display "I ate a small order of octopus dumplings in Osaka. I feel rejuvenated. [10]" in the result detail display area 46 described hereinafter. The event result of the Osaka event shown in FIG. 7 occurring when the enthusiasm rank parameter is "fever"=1 point is that the physical strength ability value parameter that is the characteristic relating to the player character 41 increases 20 points. This ability value parameter is displayed as shown in FIG. 7 so as correspond to the number "[20]" at the end of the text display "I ate a regular-sized order of octopus dumplings in Osaka. I feel rejuvenated. [20]" in the result detail display area 46 described hereinafter. The event result of the Osaka event shown in FIG. 8 occurring when the enthusiasm rank parameter is "high fever"=2 points is that the physical strength ability value parameter that is the characteristic relating to the player character 41 increases 50 points. This ability value parameter is displayed as shown in FIG. 8 so as correspond to the number "[50]" at the end of the text display "I ate a giant-sized order of octopus dumplings in Osaka. I feel rejuvenated. [50]" in the result detail display area 46 described hereinafter. Specifically, the point increase of the physical strength ability value parameter that is the characteristic relating to the player character 41 varies to 10 points, 20 points, or 50 points according to whether the enthusiasm rank parameter is "normal"=0 points, "fever"=1 point, or "high fever"=2 points, respectively. In the game character characteristic variable varying routine of step S6, when the result of the predetermined event with respect to a game character in the belonging group is determined, i.e., when the increased physical strength ability value parameter that is the characteristic relating to the player character 41 is determined, the process proceeds to the belonging group event result determining routine (S7), and the result of the predetermined event with respect to the game character in the belonging group is determined. In the belonging group event result determining routine of step S7, when the result of the predetermined event with respect to the game character in the belonging group is determined, the process proceeds to a belonging group variable varying routine for varying the belonging group variable according to the result of the predetermined event with respect to the game character in the belonging group (S8).

In the belonging group variable varying routine of step S8, the belonging group variable is varied according to the result of a predetermined event with respect to a game character in the belonging group. In this arrangement, the result of a predetermined event with respect to a game character in the belonging group is a result that is a condition for finishing the game, for example, and is the result of a predetermined game-finishing event in which the player character 41 is named as a pro baseball player in a draft conference event, or an event in which the team to which the player character 41 belongs wins in the Koshien Tournament event, and the player character 41 is named as a pro baseball player in the draft conference event. Specifically, for a result in which the player character 41 is named as a pro baseball player in the draft conference event, the enthusiasm rank parameter that is the belonging group variable increases one point, and the enthusiasm rank parameter increases from "normal"=0 point to "fever"=1 point (see FIGS. 16 and 17). For a result in which the team to which the player character 41 belongs wins in the Koshien Tournament event, and the player character 41 is named as a pro baseball player in the draft conference event, the enthusiasm rank parameter that is the belonging group variable increases two points, and the enthusiasm rank parameter increases from "normal"=0 points to "high fever"=2 points (see FIGS. 18 and 19). In this arrangement, the enthusiasm rank parameter that is the belonging group variable is varied according to the result of the predetermined event with respect to the player character.

In the game character characteristic variable varying routine of step S10, the result of a predetermined event with respect to a game character in the related belonging group is determined according to the belonging group variable. In this arrangement, the result of a predetermined event with respect to a game character in the related belonging group is determined according to the enthusiasm rank parameter of Osaka Prefecture, which is the belonging group variable of the administrative division to which the game character belongs. Specifically, when the administrative division that is the related belonging group is Wakayama Prefecture, the event shown in FIG. 9 of eating a pickled plum in Wakayama Prefecture occurs, and the increase ratio of the ability value parameter of physical strength as the characteristic relating to the player character 41 varies according to the enthusiasm rank parameter with respect to the event of eating a pickled plum in Wakayama Prefecture. In this arrangement, the variation ratio of the characteristic relating to the player character 41 varies more significantly the larger the enthusiasm rank parameter of Osaka Prefecture is. Specifically, the event result of the Wakayama Prefecture event shown in FIG. 10 occurring when the enthusiasm rank parameter of Osaka Prefecture is "normal"=0 points is that the physical strength ability value parameter that is the characteristic relating to the player character 41 increases 10 points. The event result of the Wakayama Prefecture event shown in FIG. 11 occurring when the enthusiasm rank parameter of Osaka Prefecture is "fever"=1 point is that the physical strength ability value parameter that is the characteristic relating to the player character 41 increases 20 points. The event result of the Wakayama Prefecture event shown in FIG. 12 occurring when the enthusiasm rank parameter of Osaka Prefecture is "high fever"=2 points is that the physical strength ability value parameter that is the characteristic relating to the player character 41 increases 50 points. Specifically, the point increase of the physical strength ability value parameter that is the characteristic relating to the player character 41 varies to 10 points, 20 points, or 50 points according to whether the enthusiasm rank parameter of Osaka Prefecture is "normal"=0 points, "fever"=1 point, or "high fever"=2 points, respectively. In the game character characteristic variable varying routine of step S10, when the result of the predetermined event with respect to a game character in the related belonging group is determined, i.e., when the increased physical strength ability value parameter that is the characteristic relating to the player character 41 is determined, the process proceeds to a related belonging group event result determining routine (S11), and the result of the predetermined event with respect to a game character in the related belonging group is determined. When the result of the predetermined event with respect to a game character in the related belonging group is determined in the related belonging group event result determining routine of step S11, the process returns to the main flow.

Figure 15:
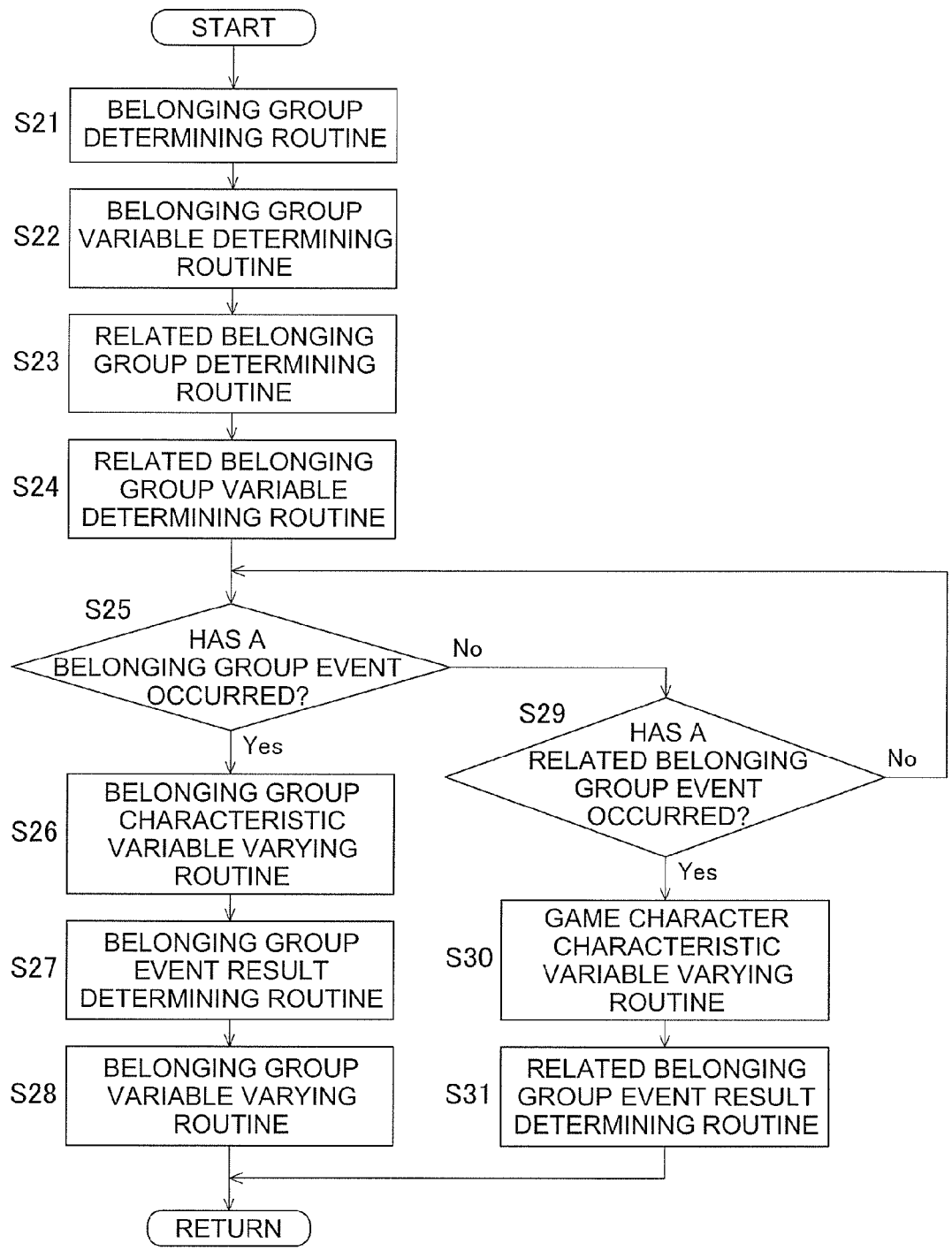
FIG. 15 is a flowchart showing the parameter variation routines applied to a belonging group with respect to various events in the baseball game.

A configuration may be adopted in which the belonging group characteristic variable variation of step S26 shown in FIG. 15 is performed instead of the game character characteristic variable varying routine of step S6 shown in FIG. 13. The configuration not including step S26 merely has 20 added to each of the steps shown in FIG. 13, and the details of the processing in the steps shown in FIG. 15 are the same as the details of processing in the steps shown in FIG. 13. Therefore, not detailed description thereof will be given.

In the belonging group characteristic variable varying routine of step S26 shown in FIG. 15, the variation ratio of a predetermined characteristic relating to the belonging group is varied according to the belonging group variable. The result of a predetermined event with respect to a game character in the belonging group is the result of variation of a characteristic relating to the team or administrative division due to an event relating to the administrative division that is the belonging group. Specifically, the event shown in FIG. 14 of an increase in the budget of a baseball club due to a predetermined condition occurs, and the increase ratio of a parameter indicating the maintenance condition of the team training equipment, a parameter indicating the size of the budget of the team or administrative division, or another parameter that is the characteristic relating to the belonging group varies according to the enthusiasm rank parameter. In this instance, the variation ratio of the parameter indicating the maintenance condition of the team training equipment, or the parameter indicating the size of the budget of the team or administrative division that is the characteristic relating to the belonging group varies more significantly the larger the enthusiasm rank parameter is. Specifically, in a case in which the enthusiasm rank parameter is "high fever"=2 points, the variation ratio of the parameter indicating the maintenance condition of the team training equipment, or the parameter indicating the size of the budget of the team or administrative division increases in comparison to a case in which the enthusiasm rank parameter is "normal"=0 points. When the parameter indicating the maintenance condition of the team training equipment, or the parameter indicating the size of the budget of the team or administrative division is large, an event occurs in which player characters having high ability value parameters gather from another administrative division by gaining admission to a school outside the player characters' school zone, and the team to which the player character 41 of the player belongs is strengthened, having the effect of making it easier to win in matches and other events, and when the player character 41 trains using maintained training equipment, such effects are obtained as a larger increase ratio of the ability value parameter of the player character 41 due to training. In this arrangement, the increase ratio of the parameter indicating the maintenance condition of the team training equipment, the parameter indicating the size of the budget of the team or administrative division, or another parameter that is the characteristic relating to the belonging group increases according to whether the enthusiasm rank parameter is "normal"=0 points, "fever"=1 point, or "high fever"=2 points.

In this game program, the belonging group to which the game character belongs is determined by the belonging group determining routine of step S1, the belonging group variable is determined by the belonging group variable determining routine of step S2, the result of a predetermined event with respect to the game character in the belonging group is determined according to the belonging group variable by the belonging group event result determining routine of step S7, and the belonging group variable is varied according to the result of the predetermined event with respect to the game character in the belonging group by the belonging group variable varying routine of step S8. Specifically, the prefecture to which the player character 41 belongs is determined to be Osaka Prefecture by the belonging group determining routine of step S1, the enthusiasm rank parameter of Osaka Prefecture is determined to be "normal"=0 points by the belonging group variable determining routine of step S2, the result of a predetermined event with respect to the player character 41 is determined by the belonging group event result determining routine of step S7, and the enthusiasm rank parameter of Osaka Prefecture is varied according to the result of the predetermined event with respect to the player character 41 by the belonging group variable varying routine of step S8. In this arrangement, the administrative division or other belonging group, and the enthusiasm rank parameter or other belonging group variable are newly introduced, and the enthusiasm rank parameter increases according to the result, of a predetermined event in which the player character 41 is named as a pro baseball player in a draft conference event, such as an event in which the team to which the player character 41 belongs wins in the Koshien Tournament event, and the player character 41 is named as a pro baseball player in the draft conference event. Since naming of the player character 41 as a pro baseball player in the draft conference event is a condition for finishing the game, when one player character 41 becomes a pro baseball player, and the game is finished, if the player selects the same Osaka Prefecture in the next game as in the previous game, the enthusiasm rank parameter of Osaka Prefecture is increased from "normal"=0 points to "fever"=1 point. Since the enthusiasm rank parameter is a parameter for indicating the degree of influence that the administrative division has on the player character 41 belonging to the administrative division, the degree of influence exerted by the administrative division on the player character 41 belonging to the administrative division increases when the enthusiasm rank parameter of the re-selected Osaka Prefecture increases, and an environment can therefore be obtained in which the player can develop a new player character more easily than in the previous game. Consequently, since the player can obtain the benefit of an increased enthusiasm rank parameter for having finished the previous game, the player character is no longer developed from the beginning in the same type of environment as the previous game regardless of the fact that the previous game was finished, as in the conventional game, and the fun of the game is increased. Furthermore, the player can also increase the enthusiasm rank parameter of each administrative division, and a new, conventionally unavailable game objective can be obtained in which player characters that newly enter the team every following year, for example, are played in an improved environment created by the player, and the player can therefore continue to build better environments for the player characters. Specifically, a game can be provided that induces the player to play repeatedly.

Furthermore, since the result of a predetermined event is determined by the belonging group event result determining routine of step S7 according to the enthusiasm rank parameter that is the belonging group variable, i.e., since the variation ratio of a characteristic relating to the player character, or a characteristic relating to the team or administrative division is varied according to the enthusiasm rank parameter, the team objective of increasing the enthusiasm rank parameter of each administrative division is more clearly defined, and the player can therefore be induced to play the game repeatedly.

Other Embodiments (a) In the aforementioned embodiment, a home video game apparatus was used as an example of a computer to which the game program can be applied, but the game apparatus is not limited to the embodiment described above. The present invention can also be applied in the same manner to a game apparatus in which the monitor is provided separately, a game apparatus in which the monitor is integrated, a personal computer or workstation for functioning as the game apparatus by executing the game program, or the like.

(b) The present invention also includes a program for executing a game such as the one described above, a program method for executing a game such as the one described above, and a computer-readable recording medium in which the program is stored. Examples of the recording medium other than a cartridge include computer-readable flexible disks, semiconductor memory, CD-ROM, DVD, MO, ROM cassettes and other media.

(c) In the aforementioned embodiment, a baseball game was described as an example of a contest game, but the contest game is not limited by the aforementioned embodiment, and the present invention can be applied to various types of games insofar as the game is a contest game having a plurality of contest events. For example, the present invention can be applied in the same manner to soccer, hand-to-hand fighting, and various other sports games, and to simulation games, shooting games, role-playing games, and the like.

(d) In the aforementioned embodiment, the degree to which the player character 41 is influenced by a predetermined event in the related belonging group is varied according to the enthusiasm rank parameter in the related belonging group event result determining means 60, but a configuration may also be adopted in which the probability of generating a predetermined event in the related belonging group is varied according to the enthusiasm rank parameter, as shown in FIG. 20. Specifically, the probability of a predetermined event occurring in the belonging group is 50% when the enthusiasm rank parameter is "normal"=0 points, the probability of a predetermined event occurring in the belonging group is 70% when the enthusiasm rank parameter is "fever"=1 point, and the probability of a predetermined event occurring in the belonging group is 100% when the enthusiasm rank parameter is "high fever"=2 points. A configuration may also be adopted in which the probability of generating a predetermined event in the belonging group is varied according to the enthusiasm rank parameter in the belonging group event result determining means 54. Specifically, the probability of a predetermined event occurring in the related belonging group is 10% when the enthusiasm rank parameter is "normal"=0 points, the probability of a predetermined event occurring in the related belonging group is 20% when the enthusiasm rank parameter is "fever"=1 point, and the probability of a predetermined event occurring in the related belonging group is 30% when the enthusiasm rank parameter is "high fever"=2 points.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents

INDUSTRIAL APPLICABILITY

In the game program according to the present invention, the belonging group to which the game character belongs is determined by the belonging group determining function, the belonging group variable is determined by the belonging group variable determining function, and the belonging group variable is varied according to the result of a predetermined event with respect to the game character in the belonging group by the belonging group variable varying function. A game can therefore be provided in which the player is induced to play the game repeatedly, while the fun of the game is increased.

What is claimed is:

1. A non-transitory computer readable medium storing a computer program for a video game in which game characters are operated by a player and the game character increases ability in the video game, the computer program comprising:
    code for determining a geographical region to which the game character belongs;
    code for determining a first region variable which is predetermined before a first game contest, the game character being operated by the player in the first game contest;
    code for determining a first result of a first event of the first game contest on the basis of the first region variable, the first event being a sport event of a prescribed sport;
    code for determining a second region variable on the basis of the first result;
    code for applying the second region variable to a second game contest subsequent to the first game contest, the game character being operated by the player in the second game contest;
    code for determining a related region having prescribed relationship with the geographical region, a second game character belonging to the related region; and
    code for determining a second result of a second event being a sport event of the prescribed sport in the second game contest on the basis of the second region variable,
    the geographical region being selected from a plurality of group candidates,
    the first and second region variables being enthusiasm in the geographical region towards the prescribed sport which influences how to increase the ability of the game character of the video game, the ability being related to the prescribed sport,
    the enthusiasm in the geographical region towards the prescribed sport becoming larger, as a budget for the prescribed sport becomes larger.

2. The non-transitory computer readable medium according to claim 1, the computer program further comprising
    code for determining a second result of a second event in the second game contest on the basis of the second region variable.

3. The non-transitory computer readable medium according to claim 2, wherein
    the second result is determined by varying a variation ratio of a predetermined characteristic of the game character on the basis of the second region variable.

4. The non-transitory computer readable medium according to claim 1, wherein
    a probability that an event being related to the prescribed sport becomes larger as the enthusiasm becomes larger.

5. The non-transitory computer readable medium according to claim 3, the computer program, further comprising
code for determining a related region having prescribed relationship with the geographical region to which a second game character belongs, and
code for determining a first related region variable which is predetermined before a third game contest, the second game character being operated in the third game contest;
code for determining a third result of a third event of the third game contest on the basis of the first related region variable;
code for determining a second related region variable on the basis of the third result, and
code for determining a second result of a second event in the second game contest on the basis of the second region group variable,
the first and second related region variables being the enthusiasm in the geographical region towards the prescribed sport which influences how to increase the second ability of the second character.

6. The non-transitory computer readable medium according to claim 5, further comprising
code for determining a fourth result of a fourth event in a fourth game contest on the basis of the first region variable, wherein
the second game character is operated in the fourth game contest, and
the fourth result is determined by varying a second variation ratio of a second predetermined characteristic of the second game character on the basis of the second related region variable.

7. A game apparatus for a video game in which a game character is operated by a player and the game character increases ability in the video game, the game apparatus comprising:
an input device configured for the user to input a command;
a non-transitory computer readable medium storing a computer program for the video game; and
a central processing unit (CPU) configured to determine a geographic region to which the game character belongs, determine a first region variable which is predetermined before a first game contest, for determining a second region variable on the basis of a first result of a first event of a first game contest in which the game character is operated by the player, the first event being a sport event of a prescribed sport, and for applying the second region variable to a second game contest subsequent to the first game contest in which the game character is operated by the player, determine a related region having prescribed relationship with the geographical region, a second game character belonging to the related region, and determine a second result of a second event being a sport event of the prescribed sport in the second game contest on the basis of the second region variable,
the geographical region being selected from a plurality of group candidates,
the first and second region variables being enthusiasm in the geographical region influencing how to increase the ability of the game character of the video game, the ability being related to the prescribed sport,
the enthusiasm in the geographical region towards the prescribed sport becoming larger, as a budget for the prescribed sport becomes larger.

8. A method for controlling a video game in which a game character is operated by a player and the game character increases ability in the video game, the method comprising executing instructions stored in memory, wherein execution of the instructions by a processor includes steps of:
determining a geographical region to which the game character belongs;
determining a first region variable which is predetermined before a first game contest, the game character being operated by the player using an input unit in the first game contest;
determining a first result of a first event of the first game contest on the basis of the first region variable, the first event being a sport event of a prescribed sport;
determining a second region variable on the basis of the first result;
applying the second region variable to a second game contest subsequent to the first game contest, the game character being operated by the player in the second game contest;
determining a related region having prescribed relationship with the geographical region, a second game character belonging to the related region; and
determining a second result of a second event being a sport event of the prescribed sport in the second game contest on the basis of the second region variable,
the geographical region being selected from a plurality of group candidates,
the first and second region variables being enthusiasm in the geographical region towards the prescribed sport which influences how to increase the ability of the game character of the video game, the ability being related to the prescribed sport,
the enthusiasm in the geographical region towards the prescribed sport becoming larger, as a budget for the prescribed sport becomes larger.

* * * * *